United States Patent
Kim et al.

(10) Patent No.: US 10,194,143 B2
(45) Date of Patent: Jan. 29, 2019

(54) AUTOSTEREOSCOPIC 3D IMAGE DISPLAY APPARATUS HAVING MODIFIED SUB-PIXEL STRUCTURE

(71) Applicant: Korea Institute of Science and Technology, Seoul (KR)

(72) Inventors: Sung Kyu Kim, Seoul (KR); Ki-Hyuk Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 187 days.

(21) Appl. No.: 15/224,747

(22) Filed: Aug. 1, 2016

(65) Prior Publication Data
US 2017/0208319 A1    Jul. 20, 2017

(30) Foreign Application Priority Data
Jan. 18, 2016    (KR) .......................... 10-2016-0005937

(51) Int. Cl.
| | |
|---|---|
| H04N 7/18 | (2006.01) |
| H04N 13/31 | (2018.01) |
| H04N 13/317 | (2018.01) |
| H04N 13/324 | (2018.01) |
| H04N 13/305 | (2018.01) |

(52) U.S. Cl.
CPC .......... *H04N 13/31* (2018.05); *H04N 13/305* (2018.05); *H04N 13/317* (2018.05); *H04N 13/324* (2018.05)

(58) Field of Classification Search
CPC ....................................................... H04N 13/31
USPC .......................................................... 348/54
See application file for complete search history.

(56) References Cited

U.S. PATENT DOCUMENTS

| | | | | |
|---|---|---|---|---|
| 2003/0117423 A1* | 6/2003 | Brown Elliott | .......... | G09G 3/20 345/690 |
| 2005/0259323 A1* | 11/2005 | Fukushima | ........ | G02B 27/2214 359/462 |
| 2009/0128900 A1* | 5/2009 | Grasnick | ............ | G02B 27/2214 359/462 |

(Continued)

FOREIGN PATENT DOCUMENTS

| | | |
|---|---|---|
| KR | 10-2005-0025935 A | 3/2005 |
| KR | 10-0824096 B1 | 4/2008 |

(Continued)

OTHER PUBLICATIONS

Korean Office Action dated Dec. 13, 2016 in corresponding Korean Patent Application No. 10-2016-0005937 (6 pages with English abstract).

*Primary Examiner* — Leron Beck
(74) *Attorney, Agent, or Firm* — NSIP Law

(57) ABSTRACT

Provided is a autostereoscopic three-dimensional (3D) image display apparatus having a modified sub-pixel structure, including: a display panel on which pixels are arranged; a parallax barrier, a lenticular lens or a linear light source disposed to be spaced apart from the display panel; and a controller generating a 3D image by arranging viewpoint images on the display panel, wherein sub-pixels having the same color are consecutively arranged on the display panel in a horizontal direction, and sub-pixels having red, green, and blue (RGB) colors form one unit pixel in a vertical direction.

11 Claims, 21 Drawing Sheets
(17 of 21 Drawing Sheet(s) Filed in Color)

(56) References Cited

U.S. PATENT DOCUMENTS

| | | | | |
|---|---|---|---|---|
| 2011/0109623 A1* | 5/2011 | Relke | ............... | G02B 27/2214 |
| | | | | 345/419 |
| 2013/0265640 A1* | 10/2013 | Saito | ............... | G02B 27/2214 |
| | | | | 359/463 |
| 2014/0009508 A1* | 1/2014 | Woodgate | ......... | H04N 13/0418 |
| | | | | 345/690 |
| 2014/0098205 A1* | 4/2014 | Usukura | ............ | G02B 27/2214 |
| | | | | 348/59 |
| 2014/0111854 A1* | 4/2014 | Kroon | ................ | G02B 27/2214 |
| | | | | 359/463 |
| 2015/0179713 A1* | 6/2015 | Lee | ...................... | H01L 27/326 |
| | | | | 257/40 |

FOREIGN PATENT DOCUMENTS

| | | |
|---|---|---|
| KR | 10-2011-0065982 A | 6/2011 |
| KR | 10-2013-0080517 A | 7/2013 |
| KR | 10-2013-0089489 A | 8/2013 |

\* cited by examiner (a)Case where vertical parallax barrier is applied (a) Z =1300 mm (OVD Position)

(b) Z=2500 m

AUTOSTEREOSCOPIC 3D IMAGE DISPLAY APPARATUS HAVING MODIFIED SUB-PIXEL STRUCTURE

CROSS-REFERENCE TO RELATED APPLICATION

This application claims priority to and the benefit of Korean Patent Application No. 2016-0005937, filed on Jan. 18, 2016, the disclosure of which is incorporated herein by reference in its entirety.

BACKGROUND

1. Field of the Invention

The present invention relates to a autostereoscopic three-dimensional (3D) image display apparatus that provides 3D images, and more particularly, to a autostereoscopic 3D image display apparatus having a modified sub-pixel structure.

2. Discussion of Related Art

A conventional autostereoscopic three-dimensional (3D) image display apparatus separates viewing zones using an optical plate, such as a lenticular lens or a parallax barrier. In this case, an observer in an observation position sees each corresponding viewpoint image for each of left and right eyes. As a result, the observer sees a 3D image.

FIG. 1 is a conceptual view of a multi-view 3D image display apparatus to which a conventional parallax barrier is applied, according to the related art, and FIGS. 2A and 2B are front views for describing types of parallax barriers in the multi-view 3D image display apparatus according to the related art. That is, FIG. 2A illustrates a case where a vertical parallax barrier is applied, and FIG. 2B illustrates a case where an inclined parallax barrier is applied. Here, the parallax barrier that is a parallax separation unit may also use a lenticular lens.

A plurality of pixels are arranged on a display panel of the conventional multi-view 3D image display apparatus to which the conventional parallax barrier illustrated in FIGS. 1, 2A, and 2B is applied. Here, a single pixel has a structure including red, green, and blue (RGB) sub-pixels in a horizontal direction. As illustrated in FIGS. 1, 2A, and 2B, single pixels are arranged in a matrix form in horizontal and vertical directions.

Referring to FIG. 1, in order to implement 3D images, a parallax barrier is disposed on a front surface of the display panel on which single pixels are arranged. Alternatively, a lenticular lens instead of the parallax barrier may be disposed as a parallax separation unit, or linear light sources arranged on a rear surface of the display panel at uniform intervals may also be used.

A common viewing zone caused by the number of designed viewpoints is implemented in an optimal viewing distance (OVD) by an optical plate designed according to the width of a pixel and the number of viewpoints of a display. FIG. 1 illustrates an example in which the common viewing zone is formed according to six viewpoint design. However, in the conventional multi-view 3D image display apparatus, the quantity of crosstalk varies with the observer's horizontal position movement (position movement parallel to the display panel).

As illustrated in FIG. 2A, in the conventional autostereoscopic 3D image display apparatus in which a vertical parallax separation unit is applied to a flat display panel having a conventional stripe type RGB pixel structure, there is an advantage that crosstalk between adjacent viewing zones is small. However, there is a disadvantage that there is chromatic dispersion of viewing zones formed in the horizontal direction and thus it is difficult to implement a 3D image of right color. For example, referring to FIG. 2A, viewing zone 3 is formed only with a blue color. Also, since resolution is reduced only in the horizontal direction due to an increase in the number of viewpoints, it is difficult to implement 3D images having proper horizontal and vertical resolution ratios.

FIG. 2B illustrates a case where an inclined parallax barrier having an angle of inclination of the parallax barrier of 18.43 degrees (arcTan(1/3)) is applied. In this way, when the inclined parallax barrier is used, the above problem that occurs in the vertical parallax barrier can be solved. That is, since, referring to FIG. 2B, viewing zone 3 is formed with RGB colors, the problem of chromatic dispersion for each viewing zone can be solved. Also, a reduction in resolution of the 3D image caused by an increase in the number of viewpoints can be divided in the horizontal and vertical directions. However, in this way, when the inclined parallax barrier is used, crosstalk between adjacent viewing zones increases. Also, when the observer is out of the OVD, bright and dark stripes (Moire phenomenon) of a screen appears in the 3D image display apparatus such that the range of observation in which an optimal 3D image can be observed, is limited.

Hereinafter, a viewing zone formation shape in the OVD and the above problem will be described with reference to FIGS. 3 and 4 in more detail.

FIG. 3 is a graph showing a color dispersion and a viewing zone formation shape in the OVD of the 3D image display apparatus to which the vertical parallax barrier illustrated in FIG. 2A is applied. Referring to FIG. 3, when the vertical parallax barrier is applied, ideally, images in adjacent viewing zones do not overlap in the center of each view zone. That is, in an ideal case, point crosstalk is 0. For example, in FIG. 3, crosstalk in the center (in a position of a left vertical dotted line) of viewing zone 6 is 0. However, when the observer is out of the center of the view zone, crosstalk with adjacent viewing zones increases rapidly, and brightness in the viewing zones is not uniform. For example, maximum crosstalk occurs in a point where two adjacent viewing zones cross. Furthermore, when the vertical parallax barrier is applied, an RGB color dispersion effect is shown in the horizontal direction, which means that it is difficult to implement proper colors of the 3D images.

FIG. 4 is a graph showing a viewing zone formation shape in the OVD of the 3D image display apparatus to which the inclined parallax barrier illustrated in FIG. 2B is applied. Referring to FIG. 4, even in an ideal case (in a position of the center of each viewpoint), point crosstalk is larger than 0. For example, crosstalk exists even in a position of a right vertical dotted line that is a position of the center of viewing zone 2. Furthermore, when the inclined parallax barrier is applied, an RGB color pixel is formed in an inclined direction. Thus, the problem of color dispersion is solved but a Moire phenomenon occurs in a depth direction out of the OVD.

FIGS. 5A and 5B are photos showing a Moire phenomenon that occurs in the conventional 3D image display apparatus to which the inclined parallax barrier is applied. In detail, FIGS. 5A and 5B are photos showing a Moire phenomenon that occurs when an angle of inclination of the parallax barrier is 18.43 degrees (arcTan(1/3)). FIG. 5A shows a case where a depth direction Z is 1300 mm (OVD position), and FIG. 5B shows a case where the depth direction Z is 2500 mm The Moire phenomenon occurs due to a geometrical interference effect between lattices of the parallax barrier and display pixels. Referring to FIG. 5B, black lines appear in the inclined direction for a predetermined period. In general, a Moire effect is not large in the OVD (in case of FIG. 5A). However, when the observer moves in the depth direction, Moire image patterns having different periods that vary with moved distances from OVD can be observed (in case of FIG. 5B). However, even when, at a particular angle of inclination smaller than arcTan(1/3), the observer is out of the designed OVD and moves in the depth direction, a full white image in which Moire is minimized, can be observed like in the OVD.

FIGS. 6 and 7 illustrate a display panel having a modified RGB sub-pixel structure designed to solve the problem of the Moire phenomenon. FIGS. 6 and 7 illustrate the display panel having a pixel structure in which R, G, and B pixels are alternately arranged in the same row in the horizontal direction, which is disclosed in Korean Patent Laid-open Publication No. 10-2005-0025935 . However, pixels in adjacent rows in the vertical direction are arranged cornerwise about 1/2. Since, in this way, arrangement of pixels is shifted to an adjacent row and the pixels are formed in a zigzag form, Moire is offset in the entire display screen so that an image can be displayed. Furthermore, even when the vertical lenticular lens is used as a parallax separation unit, a color dispersion characteristic for each viewpoint image can be offset, and the horizontal and vertical resolution reduction ratios can be adjusted. However, the pixel structure illustrated in FIGS. 6 and 7 cannot be used in horizontal RGB sub-pixel structure of the conventional stripe type, and only a parallax separation unit perpendicular to a particular sub-pixel structure can be used. FIG. 8 illustrates a display panel having a modified RGB sub-pixel structure designed to solve the above problem. FIG. 8 illustrates a 3D image display apparatus having an inclined pixel structure and a parallax separation unit disclosed in Korean Patent Laid-open Publication No. 10-2011-0065982 . In detail, RGB sub-pixels are arranged in an inclined vertical direction so as to offset the color dispersion characteristic for each viewpoint image. The sub-pixel structure is formed in a parallelogram form so that crosstalk between adjacent view zones is minimized, and the sub-pixel structure is formed so that an inclination of two sides of the sub-pixel is the same as that of the parallax barrier. However, this structure cannot be used in the conventional stripe type horizontal RGB sub-pixel structure, and in this structure, a desired effect can be achieved only in a parallax barrier having a predetermined angle of inclination in a particular sub-pixel structure.

DOCUMENT OF PRIOR ART

Patent Literature (Patent Literature 1) Korean Patent Laid-open Publication No. 10-2005-0025935

(Patent Literature 2) Korean Patent Laid-open Publication No. 10-2011-0065982

SUMMARY OF THE INVENTION

The present invention is directed to a autostereoscopic three-dimensional (3D) image display apparatus having a modified sub-pixel structure in which a color structure of pixels of a display panel is modified so that Moire and crosstalk can be reduced, the problem of a difference in resolution ratios and a color dispersion phenomenon can be improved and a degree of freedom of inclination of a parallax barrier and a lenticular lens or a linear light source can be increased.

According to an aspect of the present invention, there is provided a autostereoscopic 3D image display apparatus having a modified sub-pixel structure, including: a display panel on which pixels are arranged; a parallax barrier, a lenticular lens or a linear light source disposed to be spaced apart from the display panel; and a controller generating a 3D image by arranging viewpoint images on the display panel, wherein sub-pixels having the same color are consecutively arranged on the display panel in a horizontal direction, and sub-pixels having red, green, and blue (RGB) colors form one unit pixel in a vertical direction.

Preferably, a vertical width $W_v$ of the sub-pixel may be larger than a horizontal width $W_h$ of the sub-pixel, and more preferably, the horizontal width $W_h$ and the vertical width $W_v$ of the sub-pixel may satisfy the relationship of $W_v=3W_h$.

When sub-pixels having the RGB colors form one unit pixel in the vertical direction, the sub-pixels having the RGB colors may be arranged in a line perpendicular to the horizontal direction. Alternatively, when sub-pixels having the RGB colors form one unit pixel in the vertical direction, the sub-pixels that form the one unit pixel may be arranged when a center of the sub-pixel is sequentially moved from a reference sub-pixel row to an adjacent sub-pixel row. In this case, center movement of the sub-pixel may satisfy the following equation according to an angle of inclination of the parallax barrier, the lenticular lens or the linear light source.

$$\delta_x = W_v \tan \theta, \qquad \text{[Equation]}$$

where $\delta_x$ is the quantity of center movement of the sub-pixel, $W_v$ is a height of the sub-pixel, and $\theta$ is an angle of inclination of the parallax barrier, the lenticular lens or the linear light source.

Preferably, a width of an aperture of the parallax barrier or a line width of the linear light source may be equal to or less than 30% of a width of the sub-pixel.

The parallax barrier, the lenticular lens or the linear light source may be perpendicular to the horizontal direction of the display panel. Alternatively, the parallax barrier, the lenticular lens or the linear light source may have an angle of inclination inclined from the vertical direction of the display panel.

In this case, the angle of inclination may be arcTan(1/n), and n may be a multiple of 3 (n=3m). For example, when m is 2 , the controller may distribute viewpoint data on a cycle of two data rows, may form a reference viewpoint based on a data row close to the aperture of the parallax barrier among two data rows, may form an intermediate viewpoint of the reference viewpoint in the remaining, one data row, and may form viewpoints in data rows by moving viewpoints by one sub-pixel in a direction of inclination for one period. Alternatively, when m is 3 , the controller may distribute viewpoint data on a cycle of three data rows, may form a reference viewpoint based on a data row close to the aperture of the parallax barrier among three data rows, may form an intermediate viewpoint of the reference viewpoint in the remaining, two data rows, and may form viewpoints in data rows by moving viewpoints by one sub-pixel in a direction of inclination for one period.

Alternatively, the angle of inclination may be arcTan(1/n), and n may not be a multiple of 3 (n≠3m). For example, when n is 4 , the controller may distribute viewpoint data on a cycle of four data rows, may form a reference viewpoint based on a data row close to the aperture of the parallax barrier among four data rows, may form an intermediate viewpoint of the reference viewpoint in the remaining, three data rows, and may form viewpoints in data rows by moving viewpoints by one sub-pixel in a direction of inclination for one period.

Preferably, the autostereoscopic 3D image display apparatus may further include an observer position tracking system that determines an observer's pupil position to transmit position information to the controller.

BRIEF DESCRIPTION OF THE DRAWINGS

The patent or application file contains a least one drawing executed in color. Copies of this patent or patent application publication with color drawing(s) will be provided by the Office upon request and payment of the necessary fee. The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, various embodiments will now be described more fully with reference to the accompanying drawings in which some embodiments are shown. However, since the invention is not limited to the embodiments disclosed hereinafter, the embodiments of the invention should be implemented in various forms. The embodiments of the invention are only provided for complete disclosure of the invention and to fully show the scope of the invention to those skilled in the art, and only defined by the scope of the appended claims.

First Embodiment

Figure 9:
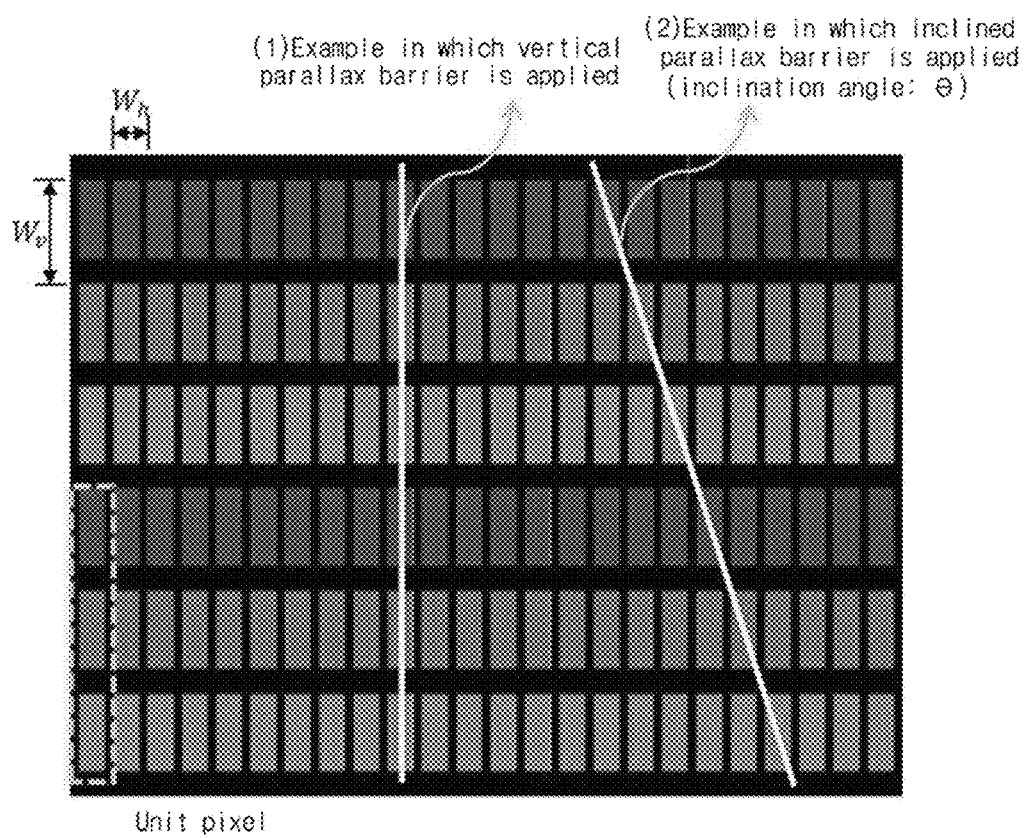
FIG. 9 is a schematic view of a pixel structure of a 3D image display apparatus according to a first embodiment of the present invention.

FIG. 9 is a schematic view of a pixel structure of a three-dimensional (3D) image display apparatus according to a first embodiment of the present invention.

Referring to FIG. 9, one unit pixel includes red, green, and blue (RGB) sub-pixels. These RGB sub-pixels are arranged in a vertical direction of a display panel. This one unit pixel is disposed in a matrix form in horizontal and vertical directions of the display panel. Thus, as illustrated in FIG. 9, sub-pixels having the same color (R, G or B) are continuously arranged in the horizontal direction. Colors of the display panel having this pixel structure are implemented with information in three RGB data rows.

As illustrated in FIG. 9, in a horizontal width $W_h$ and a vertical width $W_v$ of a sub-pixel, the vertical width $W_v$ may be larger than the horizontal width $W_h$. For example, the horizontal width $W_h$ and the vertical width $W_v$ of the sub-pixel may have the relationship of $W_v=3W_h$. Of course, both a vertical parallax barrier or an inclined parallax barrier may be applied to the display panel having this pixel structure, as illustrated in FIG. 9. Furthermore, various units, such as a lenticular lens or a linear light source, may be used for parallax separation.

When the pixel structure according to the first embodiment of the present invention is used, the RGB sub-pixels are disposed in the vertical direction. Thus, color dispersion does not occur even when a vertical parallax separation unit (a parallax barrier, a lenticular lens) or a vertical linear light source is applied. Furthermore, if the ratio of the horizontal width $W_h$ with respect to the vertical width $W_v$ of the sub-pixel satisfies the relationship of $W_v=3W_h$, a reduction in horizontal resolution may be minimized For example, when nine viewpoints are implemented by applying a pixel of 1920×1080, 3D resolution of 640×360 may be realized. That is, proper horizontal-to-vertical ratio of 3D resolution may be maintained. Furthermore, since the vertical parallax separation unit is used, crosstalk may be minimized, and a 3D display having minimized Moire may be realized.

When the pixel structure according to the first embodiment of the present invention is used, the horizontal-to-vertical ratio of 3D resolution caused by an increase in the number of viewpoints may be adjusted even when the inclined parallax separation unit (the parallax barrier, the lenticular lens) or the linear light source is applied. Furthermore, a degree of freedom at which an angle of inclination in which Moire is minimized, may be selected, is increased, and color dispersion is offset even at a certain angle of inclination. Thus, when the inclined parallax separation unit is applied, an angle of inclination which is close to the vertical and in which a Moire effect is minimized, may be used.

Figure 10A:
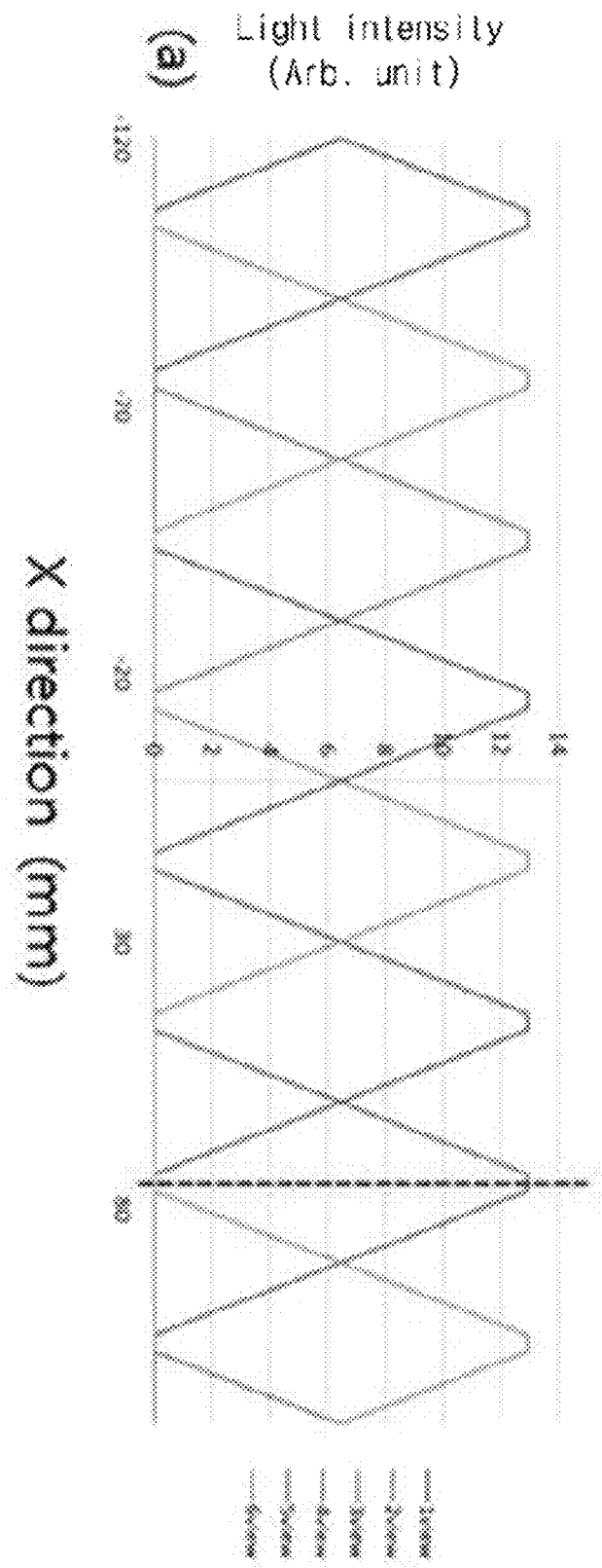
FIGS. 10A, 10B, and 10C are graphs showing the result of simulation of crosstalk according to an angle of inclination in the pixel structure illustrated in FIG. 9.
Figure 10B:
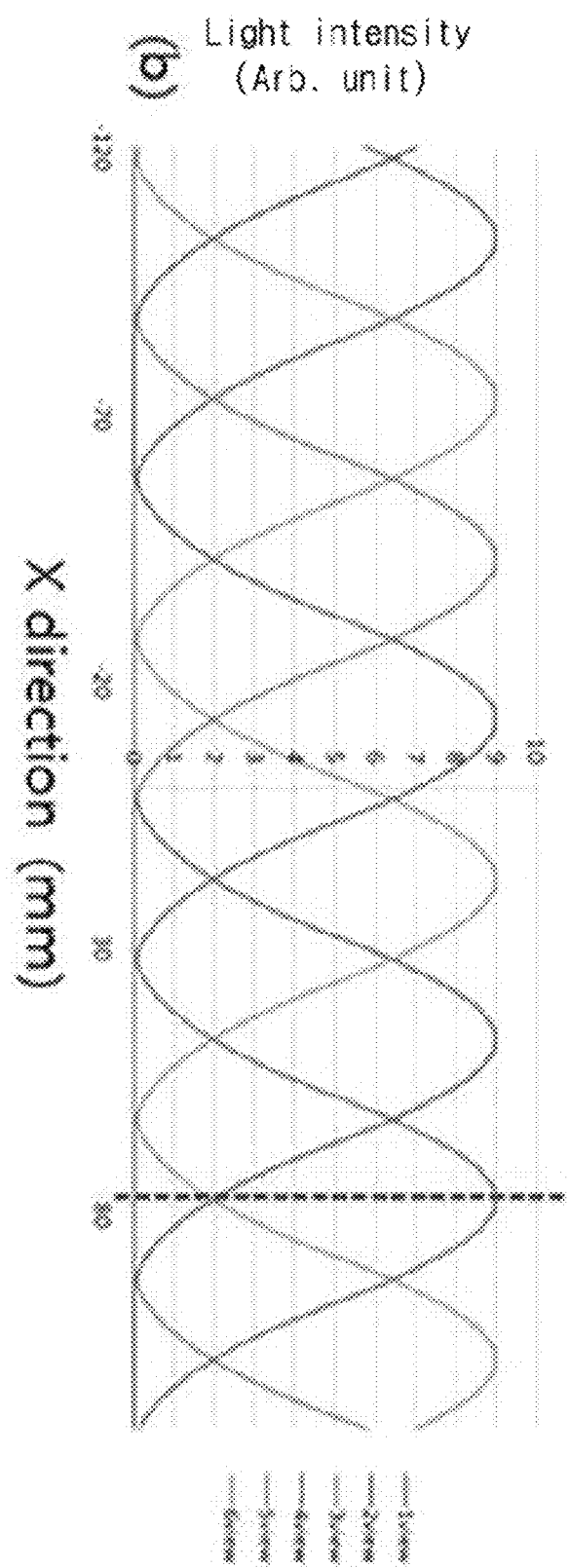
Figure 10C:
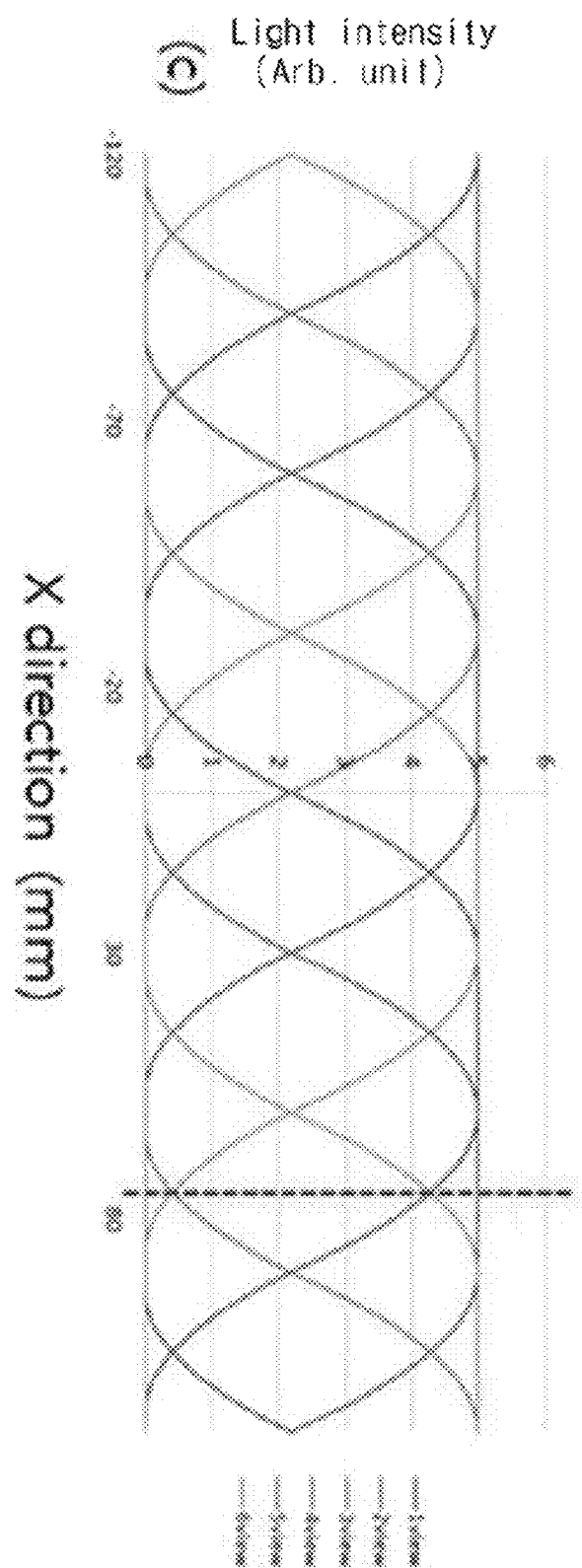

FIGS. 10A, 10B, and 10C are graphs showing the result of simulation of crosstalk of intensity of light for each viewing zones according to an angle of inclination in the pixel structure illustrated in FIG. 9. FIG. 10A illustrates a case where a vertical parallax barrier is applied, FIG. 10B illustrates a case where an inclined parallax barrier having an angle of inclination of arcTan(1/2) is applied, and FIG. 10C illustrates a case where an inclined parallax barrier having an angle of inclination of arcTan(1/1) is applied. Referring to FIGS. 10A, 10B, and 10C, crosstalk between adjacent viewing zones increases as an angle of inclination increases.

For example, when simulation is performed on the condition that an interval between six viewpoints is 30 mm and the horizontal-to-vertical ratio ($W_h/W_v$) of the sub-pixel is 1/3, crosstalk is as shown in Table 1. That is, as illustrated in FIG. 10, when an angle of inclination of the parallax barrier is 0 (perpendicular), crosstalk is ideally 0. However, as the angle of inclination increases, crosstalk also increases.

TABLE 1

| PB Inclination Angle (arcTan(1/n)) | PB Inclination Angle (degree) | Point Crosstalk (%) |
| --- | --- | --- |
| — | 0 | 0 |
| 9 | 6.34 | 4.31 |
| 6 | 9.462 | 9.03 |
| 3 | 18.435 | 23.01 |
| 2 | 26.565 | 44.07 |
| 1.5 | 33.69 | 91.61 |
| 1 | 45 | 188.31 |

Hereinafter, a method of designing viewing zones of a pixel structure of the 3D image display apparatus according to the first embodiment of the present invention will be described with reference to FIGS. 11 to 21.

Figure 11:
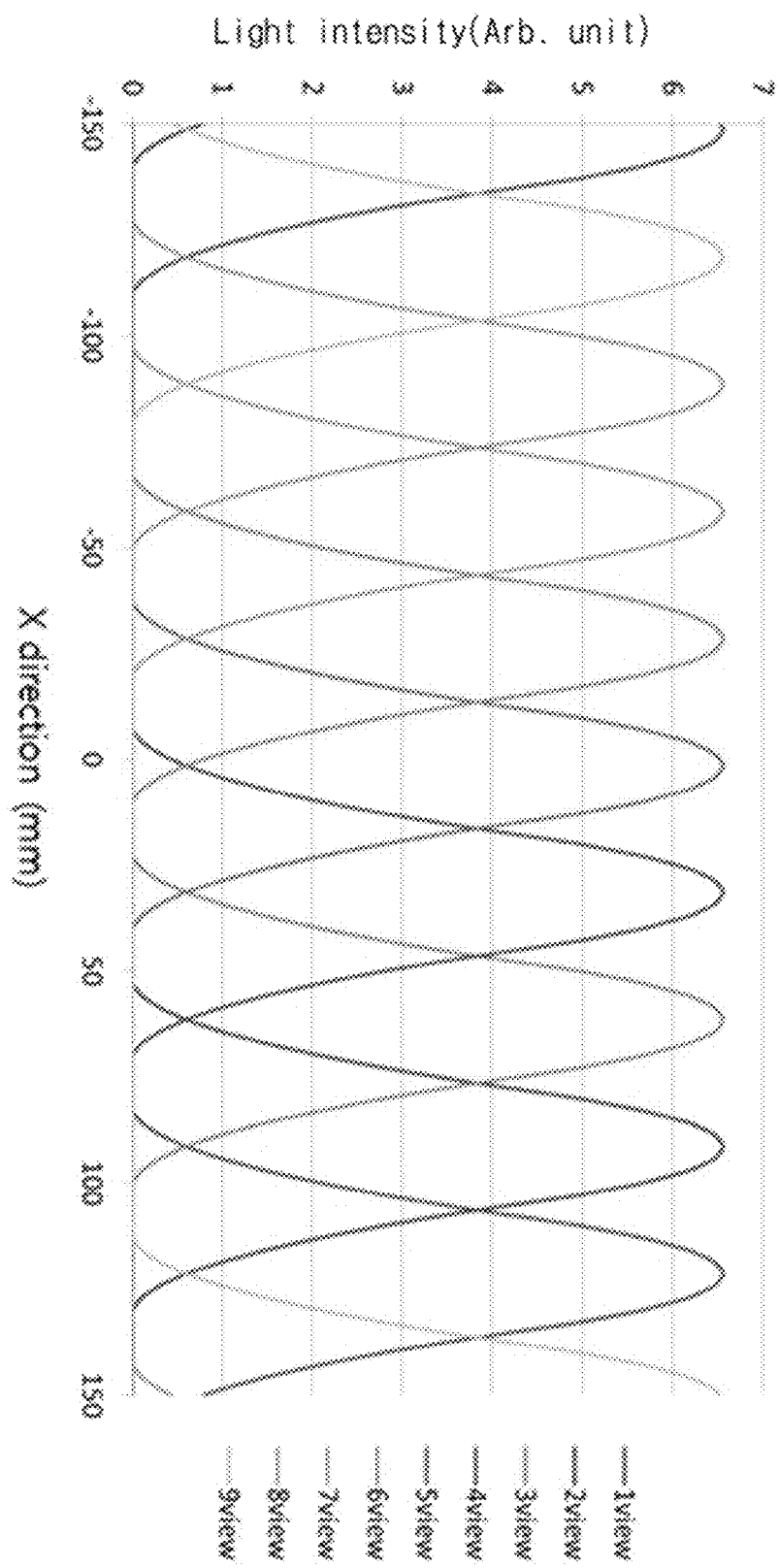
FIG. 11 is a graph showing the intensity of light for each viewpoint caused by design of viewing zones of a conventional pixel structure.

First, FIG. 11 is a graph showing the intensity of light for each viewpoint caused by design of viewing zones of a conventional pixel structure. In the conventional pixel structure, unlike in the pixel structure according to the present invention, RGB sub-pixels are arranged in one single pixel in a horizontal direction. That is, when single pixels are arranged on the display panel in horizontal and vertical directions in a matrix form, sub-pixels having the same color are arranged in the vertical direction.

Figure 1:
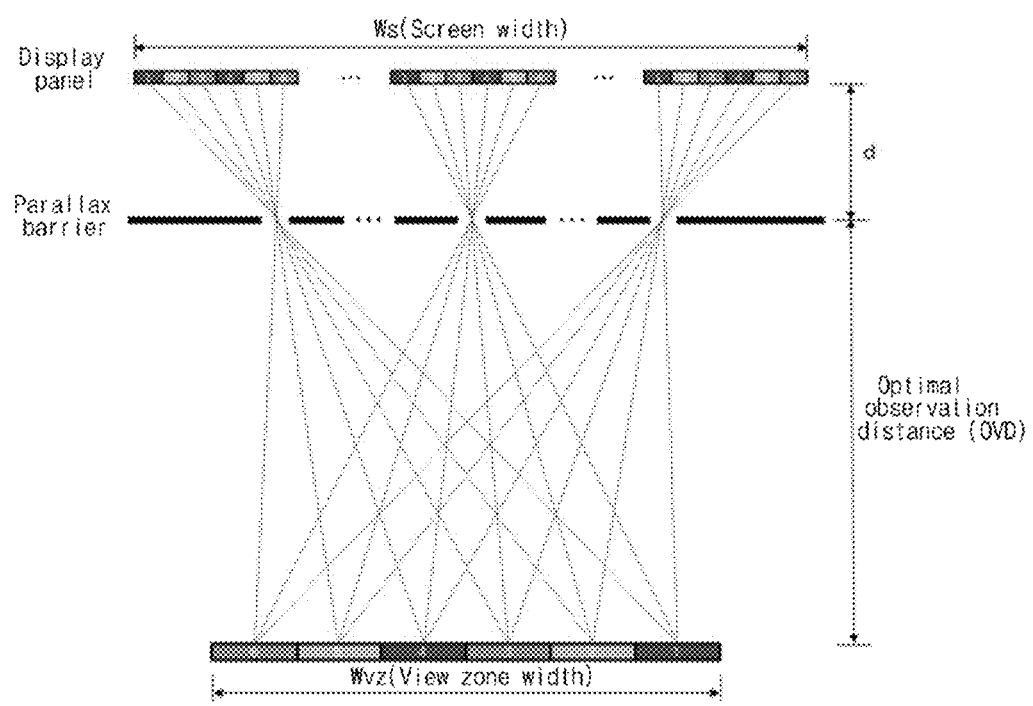
FIG. 1 is a conceptual view of a multi-view three-dimensional (3D) image display apparatus to which a conventional parallax barrier is applied, according to the related art.
Figure 2A:
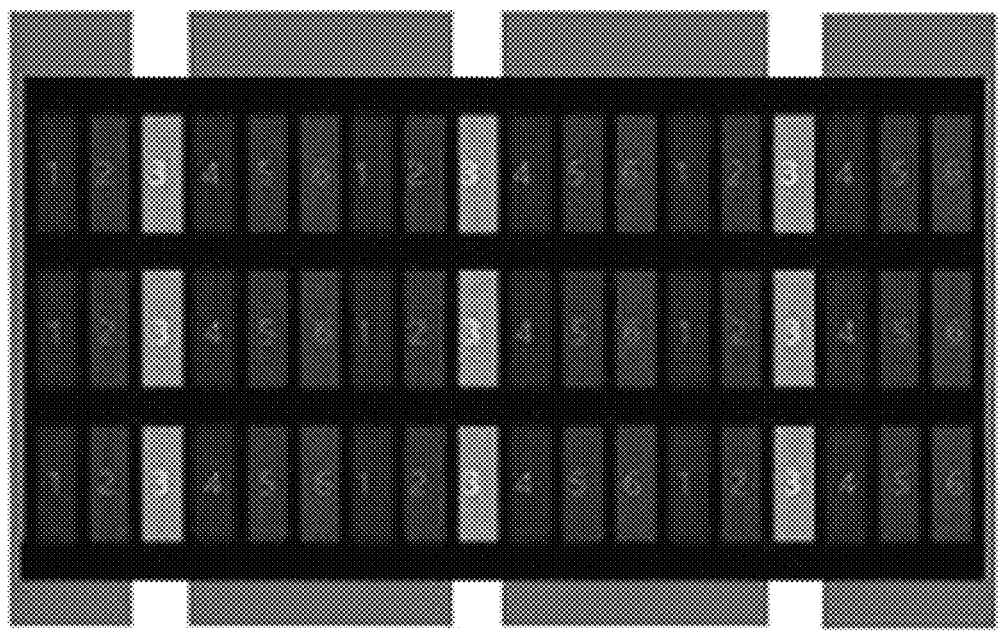
FIGS. 2A and 2B are front views for describing types of parallax barriers in the multi-view 3D image display apparatus according to the related art.
Figure 2B:
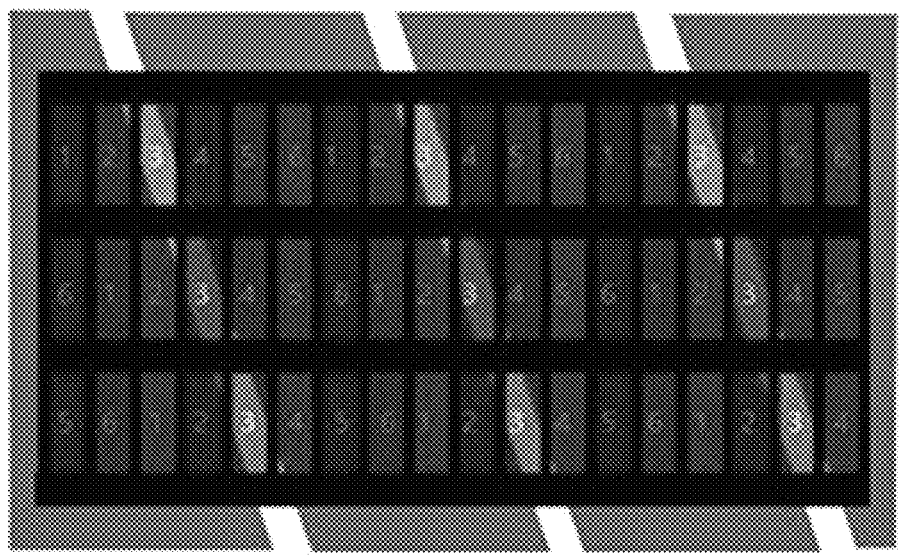
Figure 3:
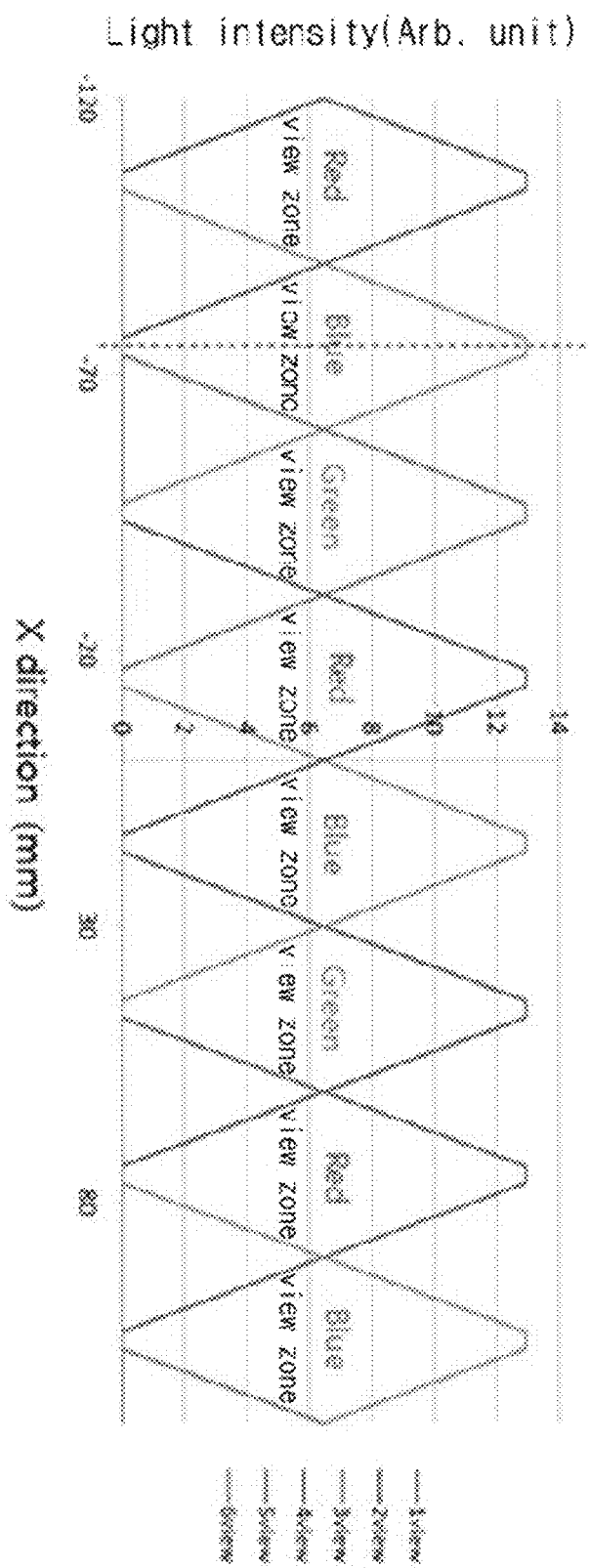
FIG. 3 is a graph showing color dispersion and a view zone formation shape in an optimal viewing distance (OVD) of the 3D image display apparatus to which the vertical parallax barrier illustrated in FIG. 2A is applied.
Figure 4:
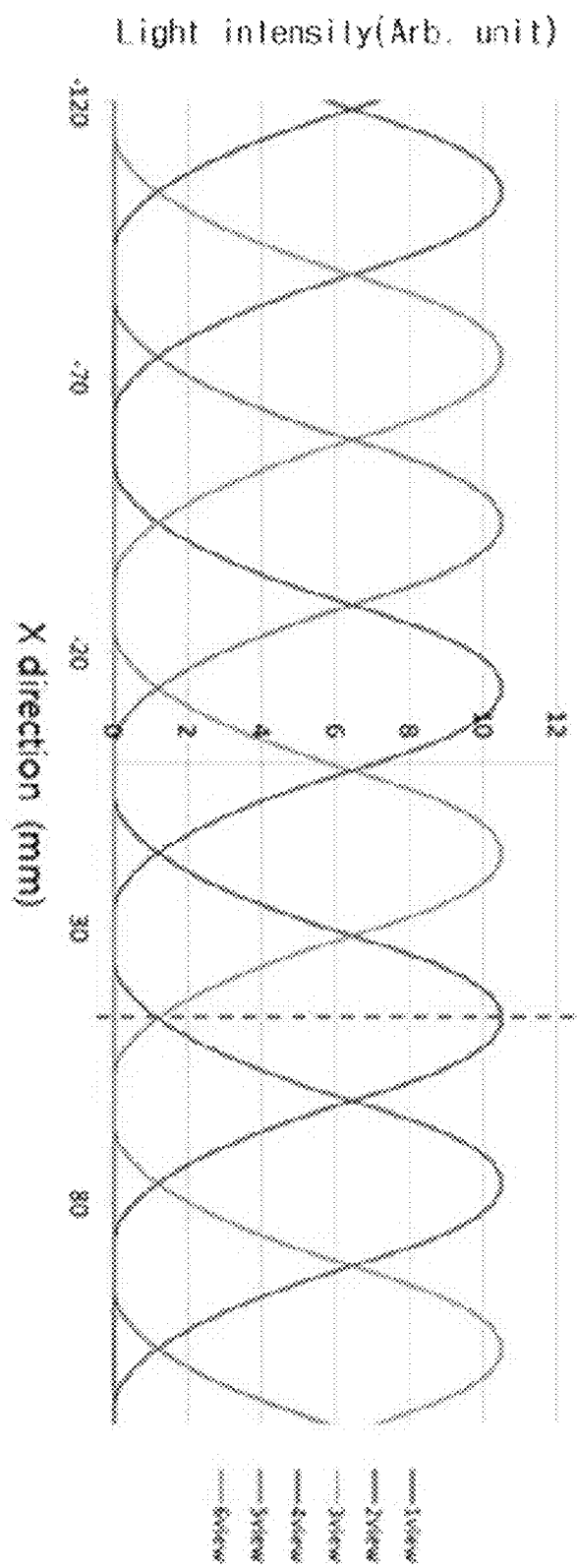
FIG. 4 is a graph showing a viewing zone formation shape in the OVD of the 3D image display apparatus to which the inclined parallax barrier illustrated in FIG. 2B is applied.
Figure 5A:
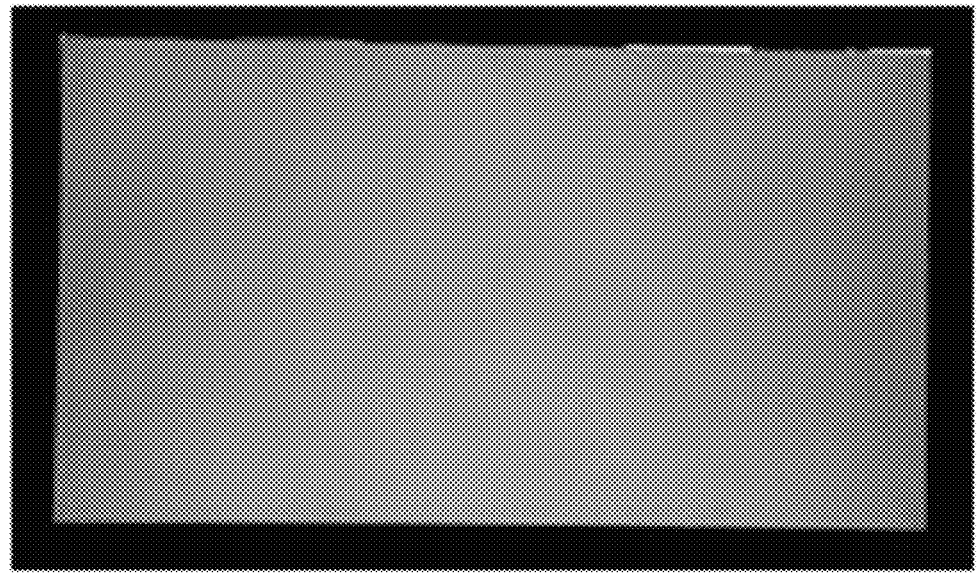
FIGS. 5A and 5B are photos showing a Moire phenomenon that occurs in the 3D image display apparatus to which the inclined parallax barrier is applied, according to the related art.
Figure 5B:
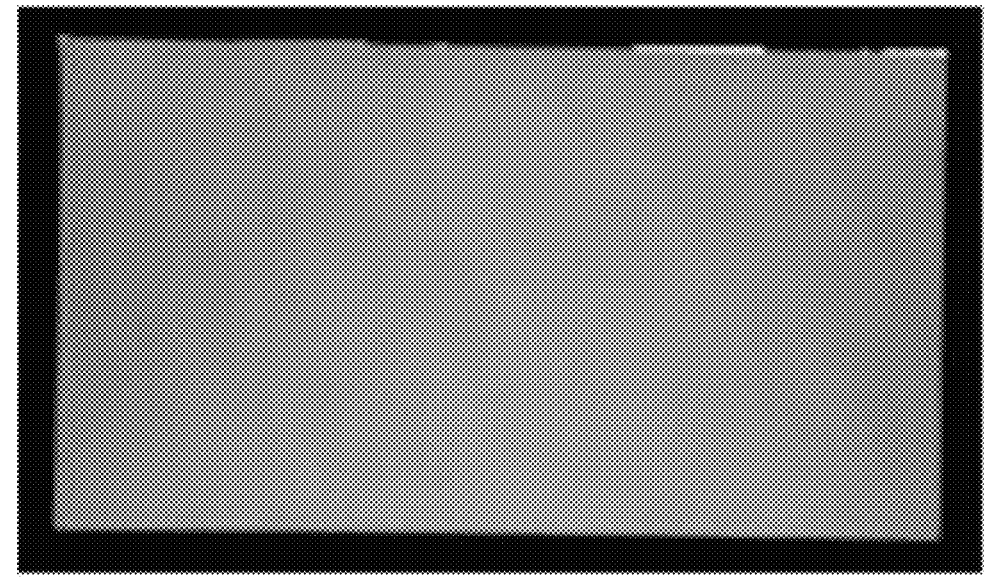
Figure 6:
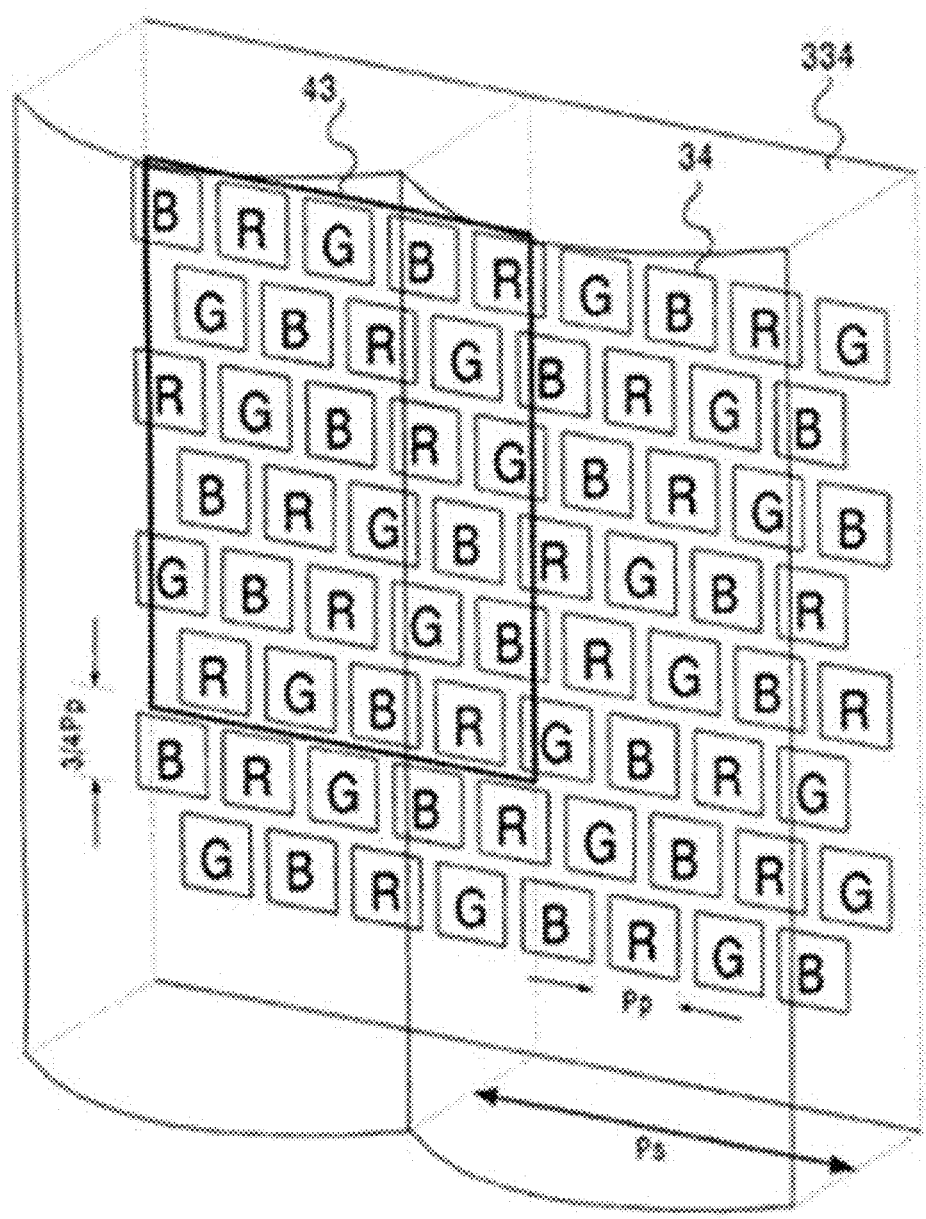
FIGS. 6 and 7 are schematic views of a display panel having a modified RGB sub-pixel structure according to the related art.
Figure 7:
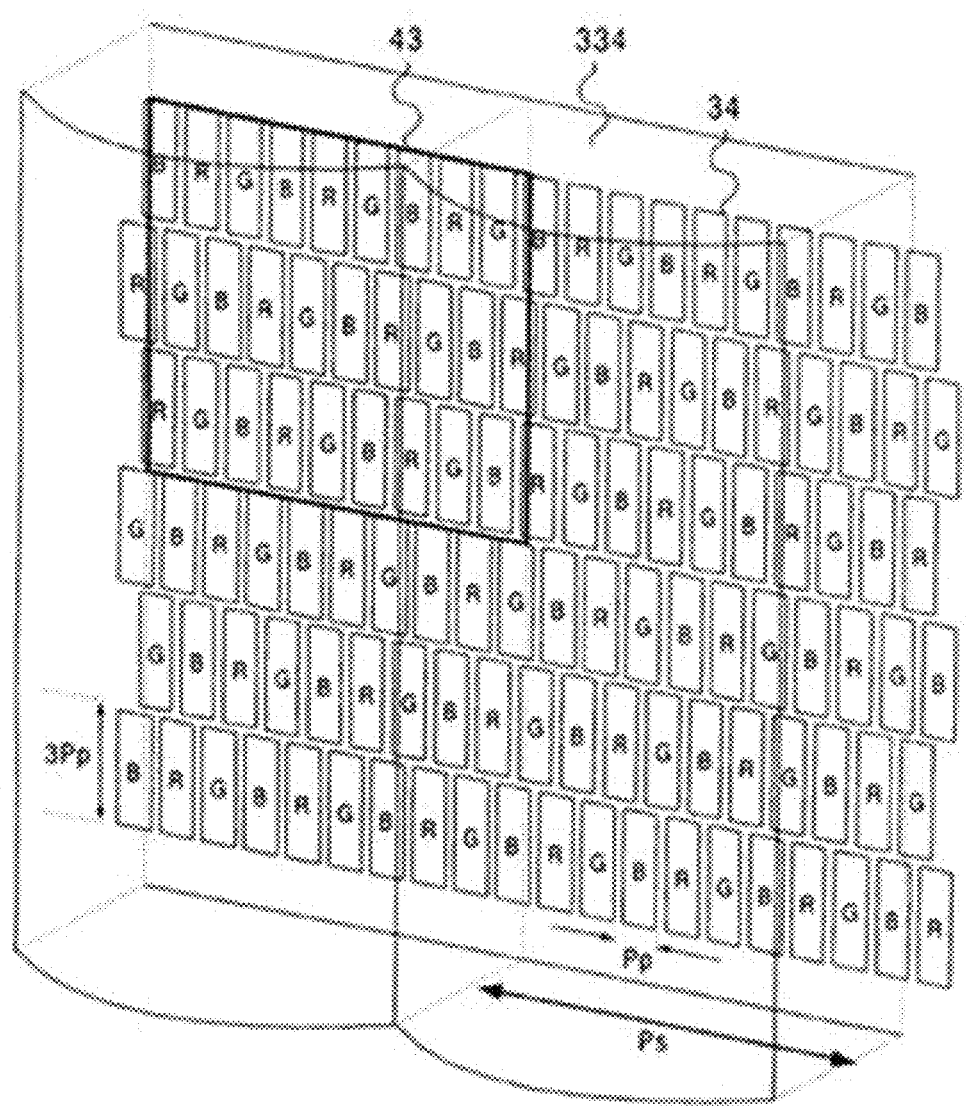
Figure 8:
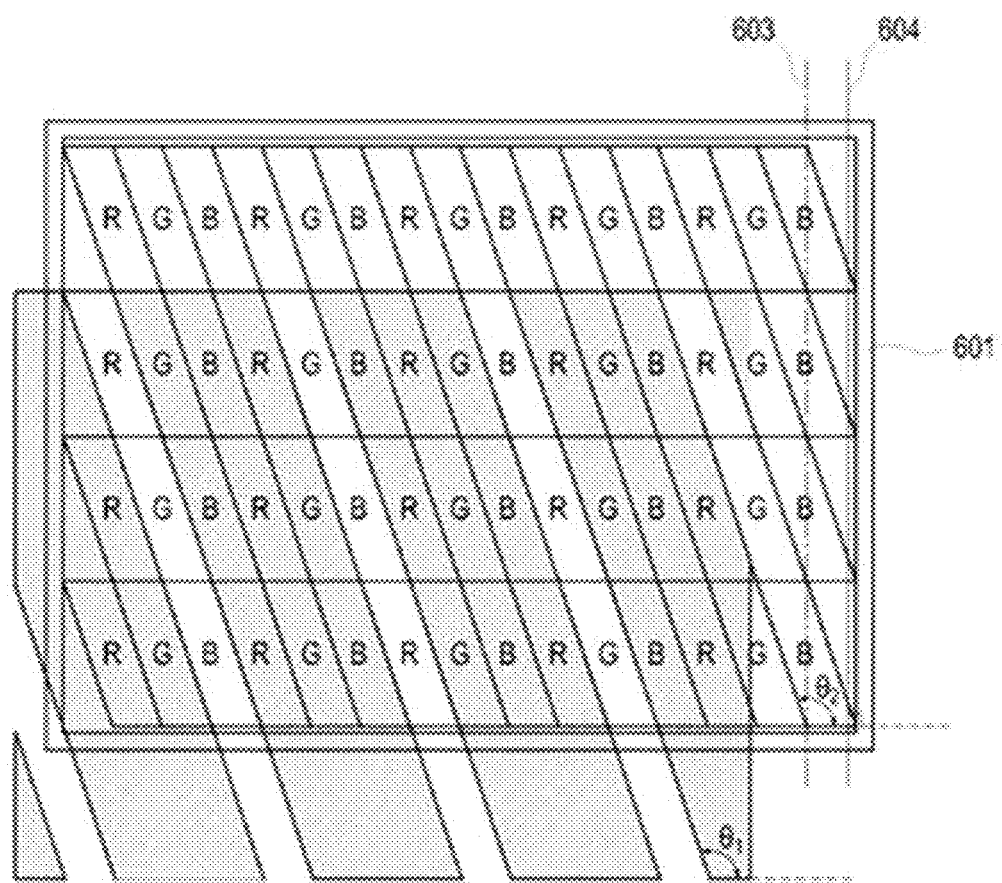
FIG. 8 is a schematic view of another display panel having a modified RGB sub-pixel structure according to the related art.

The intensity of light for each viewpoint of FIG. 11 illustrates a case where an angle of inclination of the parallax barrier is arcTan(1/3) in the conventional pixel structure. FIG. 11 also illustrates a case where an interval between nine viewpoints is 30 mm and the OVD is 1000 mm Referring to FIG. 11, when the conventional pixel structure is applied, the quantity of crosstalk between nearby viewpoints is relatively large. Also, when the conventional pixel structure is used, Moire patterns are generated in other region than the OVD (see FIG. 5).

Figure 12:
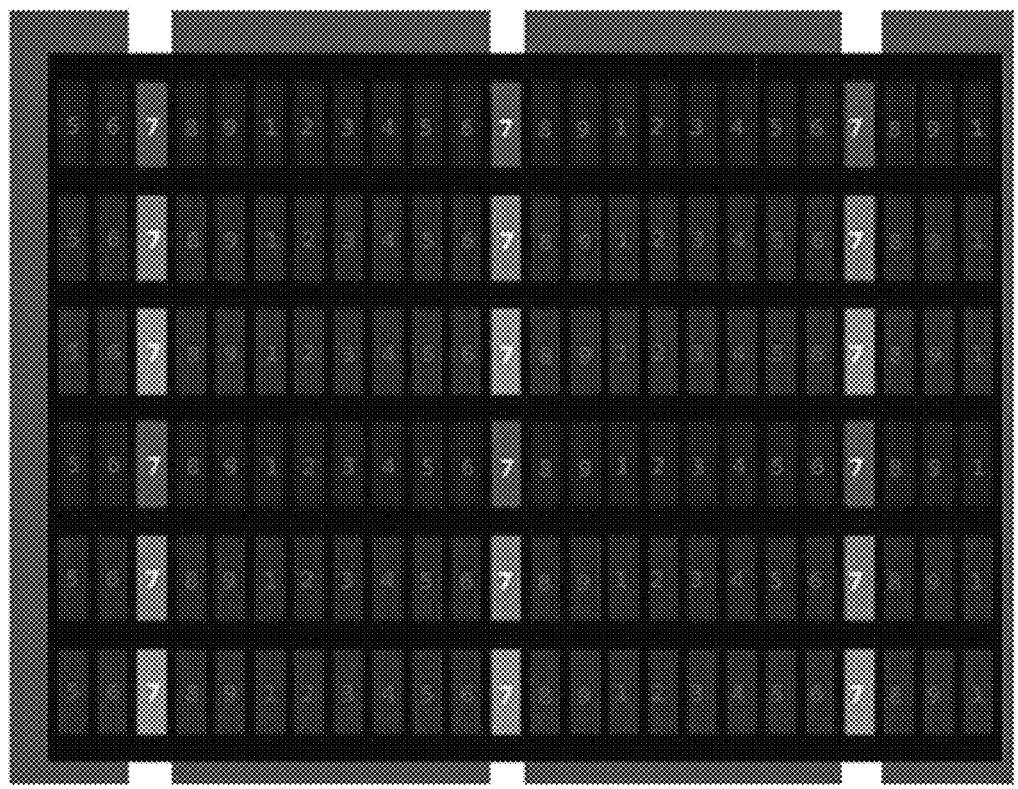
FIG. 12 is a schematic view illustrating a case where a vertical parallax barrier is applied to the pixel structure of the 3D image display apparatus according to the first embodiment of the present invention.

FIG. 12 illustrates a case where a vertical parallax barrier is applied to the pixel structure of the 3D image display apparatus according to the first embodiment of the present invention.

When the pixel structure according to the first embodiment is used in FIG. 12, interference with sub-pixel in which adjacent viewpoints are formed, is minimized so that viewing zones in which crosstalk is minimized, can be formed. Also, three RGB pixels are required in the vertical direction so as to form color in the same viewing zone (vertical resolution is reduced by ⅓). However, for example, when nine viewpoints are designed, horizontal resolution is also ⅓ so that the problem of a difference in a reduction in horizontal resolution with respect to vertical resolution does not occur.

A parallax separation unit (parallax barrier or lenticular lens) or a linear light source inclined from a vertical line may also be applied to the pixel structure of the 3D image display apparatus according to the first embodiment of the present invention. In this case, as described with reference to FIG. 10, when an angle of inclination of the parallax separation unit or the linear light source is small, viewing zones in which crosstalk is minimized, can be formed. This is because interference with sub-pixel in which adjacent viewpoints are formed, is minimized only when an angle of inclination of the parallax separation unit or the linear light source is small. Thus, when the inclined parallax separation unit is used, if a reference viewing zone is calculated for each data row, i.e., color, the angle of inclination of the parallax separation unit or the linear light source is adjusted according to the number of viewpoints within the range of a predetermined angle so that balance of horizontal-to-vertical ratio of 3D image resolution is made and simultaneously it is easy to select an angle at which a Moire phenomenon is minimized Hereinafter, the method of designing viewing zones with respect to various angles of inclination of the parallax separation unit will be described in more detail. An angle θ of inclination of the inclined parallax separation unit or the linear light source is an angle (see FIG. 9) from the vertical direction of the display panel, and an angle θ of inclination of the parallax separation unit or the linear light source is generally expressed as the following Equation 1.

$$\theta = \tan^{-1}\left[\frac{(3W_h)}{W_v}\frac{1}{n}\right] \quad \text{[Equation 1]}$$

In order to simply describe an embodiment of the present invention, when the ratio of the horizontal width $W_h$ with respect to the vertical width $W_v$ of the sub-pixel satisfies the relationship of $W_v=3W_h$, an angle of inclination of the parallax separation unit or the linear light source may be expressed as arcTan(1/n). This case may be largely classified into two cases, i.e., a case where n is a multiple of 3 (n=3m) and a case where n is not a multiple of 3 (n≠3m).

First Embodiment Example

First, a case where n is a multiple of 3 (n=3m) and m is 2, i.e., a case where n is 6, will be described (first embodiment example). In this case, an angle of inclination of the parallax separation unit or the linear light source is arcTan (1/6).

Figure 13:
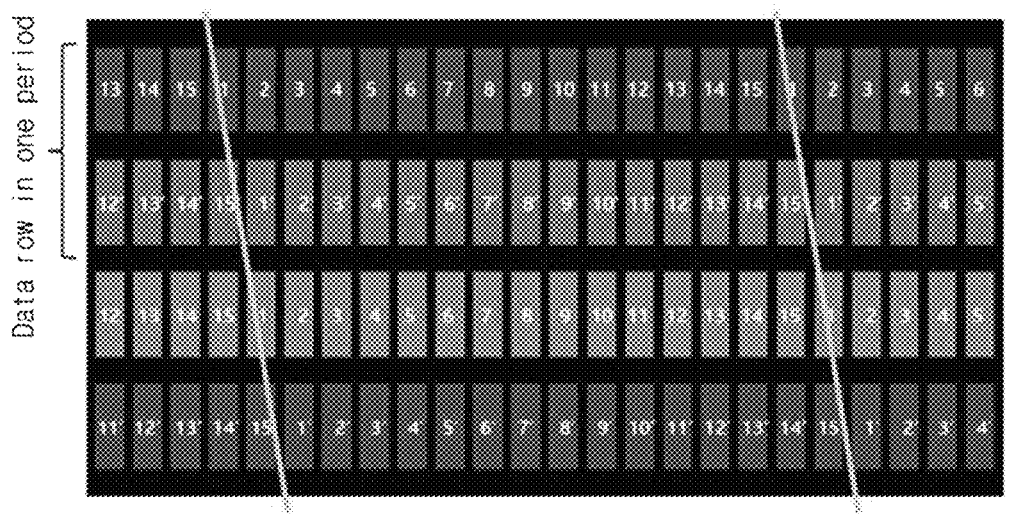
FIG. 13 is a schematic view for describing a first embodiment example in the pixel structure of the 3D image display apparatus according to the first embodiment of the present invention.

FIG. 13 illustrates a method of arranging viewpoint images for one period data row in pixels in the first embodiment example when m is 2 and n is 6. Referring to FIG. 13, an angle of inclination of the parallax barrier is arcTan(1/6), and 15 viewpoints are designed based on a first data row. As illustrated in FIG. 13, viewpoint data may be distributed on a cycle of two data rows. A reference viewpoint is formed based on a data row close to an aperture of the parallax barrier among two data rows, and an intermediate viewpoint of the reference viewpoint may be formed in the remaining data row. Viewpoints in other consecutive data rows are formed by moving one sub-pixel in a direction of inclination for one period so that view zones can be formed in the same position according to an angle of inclination of the parallax barrier.

When, in this way, the viewpoint images are arranged in a pixel, 15 viewpoints are designed in principle based on one data row. However, 15 viewpoints are added in the meantime, so that the same effect as that of a case where 30 viewpoints are formed, is shown. Also, an interval between viewpoints is reduced by ½ of a reference viewpoint interval E for one data row in an OVD position, so that the number of viewpoints is increased and an interval between viewpoints is reduced in comparison with a conventional angle of inclination of arcTan(1/3), and thus more natural movement parallax can be provided.

Figure 14:
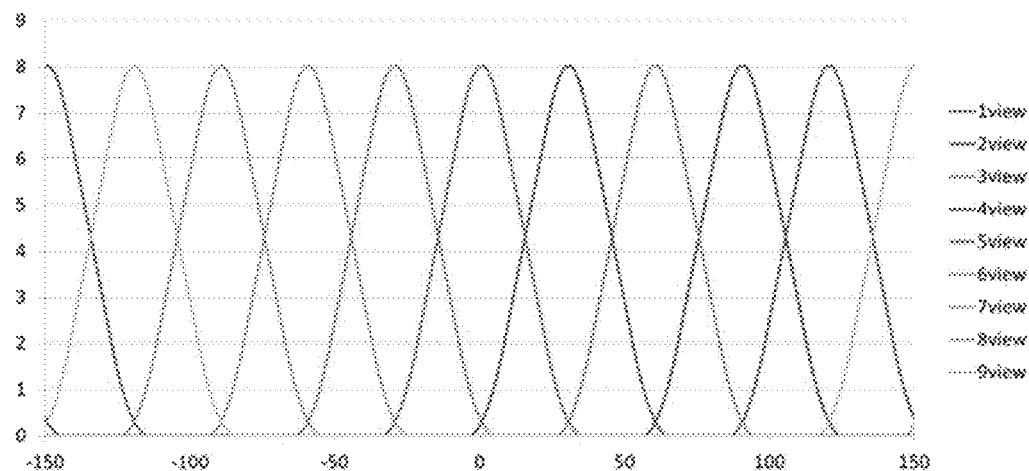
FIGS. 14 and 15 are graphs showing the intensity of light for each viewpoint when an inclined parallax separation unit or a linear light source according to the first embodiment example is applied to the pixel structure of the 3D image display apparatus according to the first embodiment of the present invention.
Figure 15:
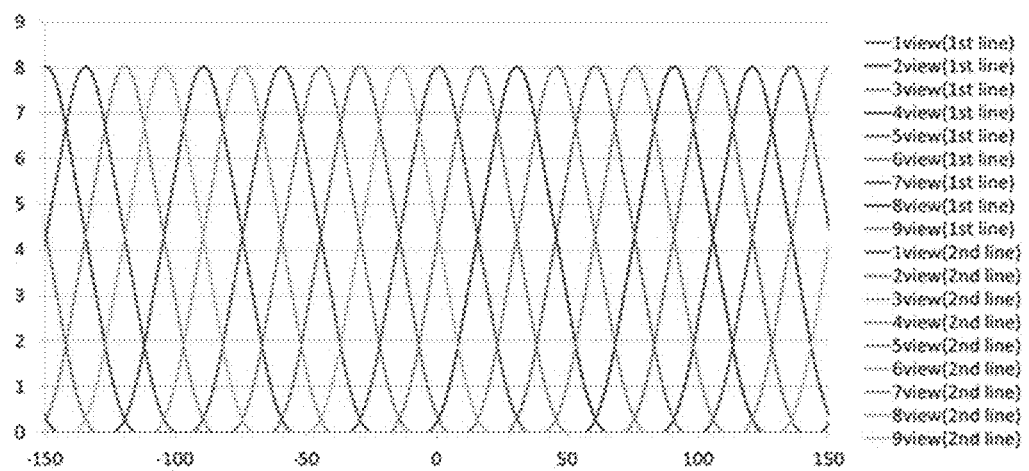

FIGS. 14 and 15 are graphs showing formation of viewing zones in a case where an inclined parallax separation unit or a linear light source according to the first embodiment example is applied to the pixel structure of the 3D image display apparatus according to the first embodiment of the present invention. In detail, FIG. 14 is a graph showing formation of viewing zones caused by pixels in a first row of a viewpoint data period in arrangement of viewpoint images of FIG. 13, and FIG. 15 is a graph showing formation of viewing zones caused by pixels in first and second rows of the viewpoint data period.

In particular, referring to FIG. 15, a viewing zone formed by pixels in the second row is formed by moving from a viewing zone formed by pixels in the first row by E/m(=30/2=15 mm) in a horizontal direction (x-axis)(in this case, E is a designed viewpoint interval and m=2), so that a viewpoint interval is 15 mm by adding the viewing zones formed in the first and second data rows. Thus, the quantity of crosstalk calculated for each data row is reduced according to an angle of inclination, and the number of representable viewpoints is increased by twice. That is, even when the number of viewpoints is increased, the quantity of crosstalk is reduced compared to arcTan(1/3) that is a conventional angle of inclination.

Second Embodiment Example

Next, a case where n is a multiple of 3 (n=3m) and m is 3, i.e., a case where n is 9, will be described (second embodiment example). In this case, an angle of inclination of a parallax separation unit or a linear light source is arcTan(1/9).

Figure 16:
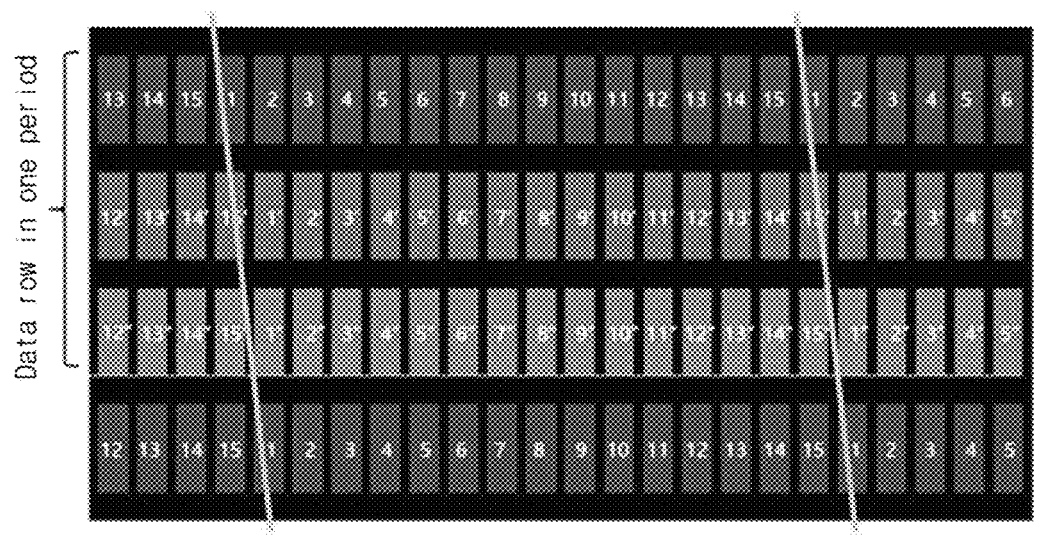
FIG. 16 is a schematic view for describing a second embodiment example in the pixel structure of the 3D image display apparatus according to the first embodiment of the present invention.

FIG. 16 illustrates a method of arranging viewpoint images for one period data row in the second embodiment example in a case where m is 3 and n is 9. Referring to FIG. 16, an angle of inclination of a parallax barrier is arcTan(1/9), and 15 viewpoints are designed based on a first data row. As illustrated in FIG. 16, viewpoint data may be distributed on a cycle of three data rows. A reference viewpoint may be formed based on a data row close to an aperture of the parallax barrier among three data rows, and an intermediate viewpoint of the reference viewpoint may be formed in the remaining two data rows. Viewpoints in other consecutive data rows are formed by moving one sub-pixel in a direction of inclination for one period, so that viewing zones can be formed in the same position according to an angle of inclination of the parallax barrier.

When, in this way, the viewpoint images are arranged in a pixel, 15 viewpoints are designed in principle based on one data row. However, 30 viewpoints are added in the meantime, so that the same effect as that of a case where 45 viewpoints are formed, is shown. Also, an interval between viewpoints is reduced by ⅓ of a reference viewpoint interval E for one data row in an OVD position, so that the number of viewpoints is increased and an interval between viewpoints is reduced in comparison with a conventional angle of inclination of arcTan(1/3), and thus more natural movement parallax can be provided. For example, the order of proceeding viewpoints in one period is 1->1"->1'->2->2"->2'-> . . . (based on a distance from the center of a reference aperture of the parallax barrier).

Figure 17:
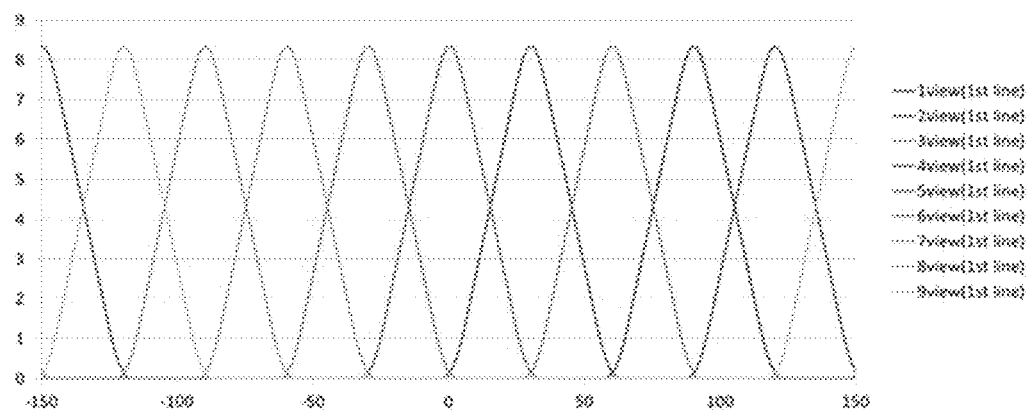
FIGS. 17 and 18 are graphs showing the intensity of light for each viewpoint when an inclined parallax separation unit or a linear light source according to the second embodiment example is applied to the pixel structure of the 3D image display apparatus according to the first embodiment of the present invention.
Figure 18:
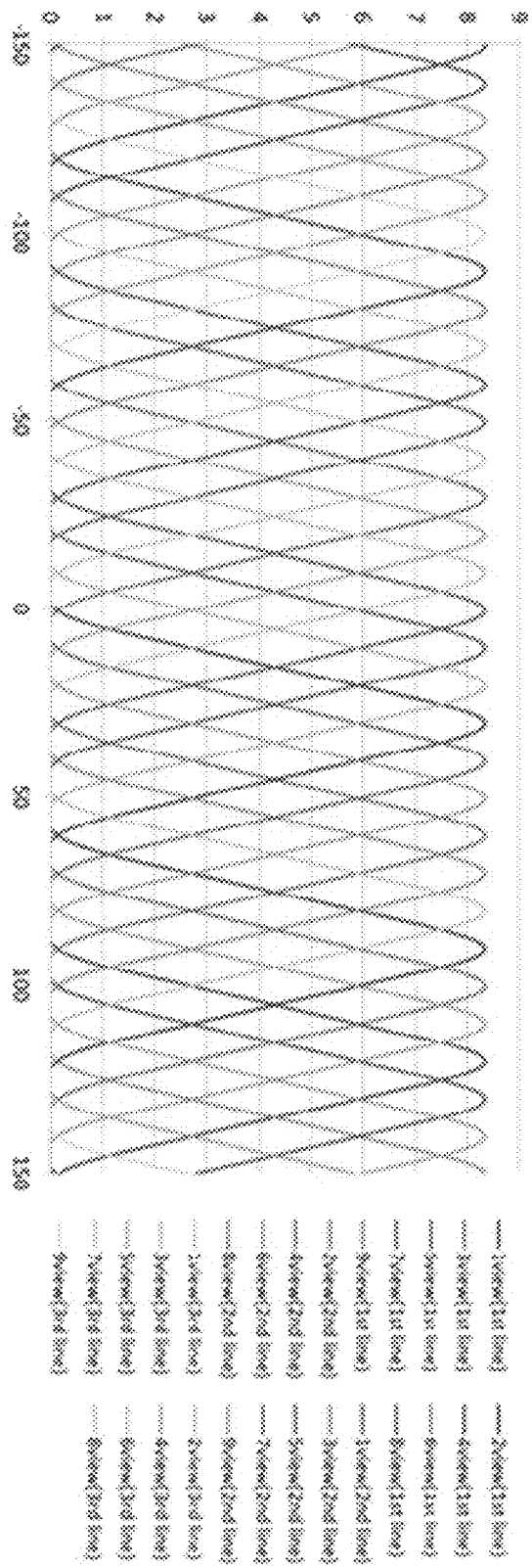

FIGS. 17 and 18 are graphs showing formation of viewing zones in a case where an inclined parallax separation unit or a linear light source according to the second embodiment example is applied to the pixel structure of the 3D image display apparatus according to the first embodiment of the present invention. In detail, FIG. 17 is a graph showing formation of viewing zones caused by pixels in a first row in a viewpoint data period in arrangement of viewpoint images of FIG. 16, and FIG. 18 is a graph showing formation of viewing zones caused by pixels in first, second, and third rows in a viewpoint data period.

In particular, referring to FIG. 18, a viewing zone formed by pixels in the third row is formed by moving from a viewing zone formed by pixels in the first row by E/m(=30/3=10 mm) in a horizontal direction (x-axis)(in this case, E is a designed viewpoint interval), and a viewing zone formed by pixels in the second row is formed by moving from a viewing zone formed by pixels in the third row by E/m(=30/3=10 mm) in the horizontal direction (x-axis)(in this case, E is a designed viewpoint interval), so that a viewpoint interval is 10 mm by adding the viewing zones formed in the first, second and third data rows. Thus, the quantity of crosstalk calculated for each data row is reduced according to an angle of inclination, and the number of representable viewpoints is increased by three times. That is, even when the number of viewpoints is increased, the quantity of crosstalk is reduced compared to arcTan(1/3) that is a conventional angle of inclination.

Third Embodiment Example

Next, a case where an angle of inclination of an inclined parallax separation unit or a linear light source is applied when n is not a multiple of 3 (n≠3m), will be described.

In this case, a method of arranging viewpoint images in a pixel may include forming the entire viewing zone based on n data rows and forming a reference view zone by designing viewpoints based on a horizontal pixel in a first data row among the n data rows, wherein viewing zones in next data rows are moved in a horizontal direction and thus viewing zones can be formed in between. This is because this design is a design for a structure for forming viewing zones for each RGB pixel and due to this design, an interval between adjacent viewing zones is reduced, and even when viewing zones are formed for each color, there is no effect of color dispersion between viewing zones.

Figure 19:
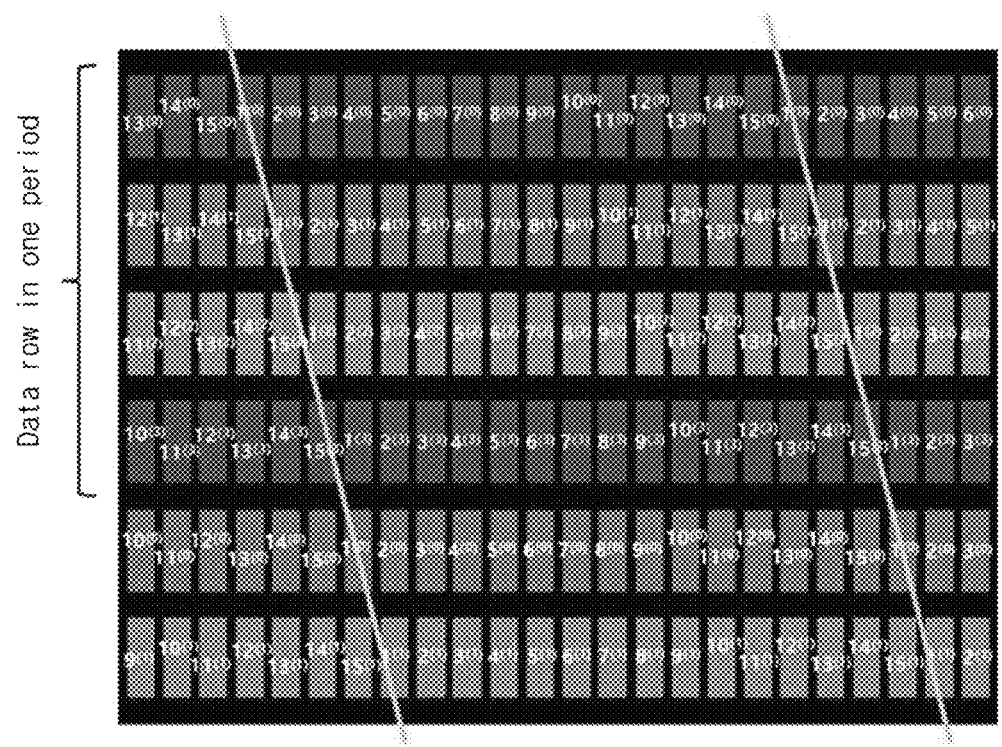
FIG. 19 is a schematic view for describing a third embodiment example in the pixel structure of the 3D image display apparatus according to the first embodiment of the present invention.

FIG. 19 illustrates a method of arranging viewpoint images for one period data row in a pixel in the third embodiment example when n is 4. Referring to FIG. 19, an angle of inclination of the parallax barrier is arcTan(1/4), and 15 viewpoints are designed based on a first data row. As illustrated in FIG. 19, viewpoint data may be distributed on a cycle of four data rows. A reference viewpoint may be formed based on a data row close to an aperture of the parallax barrier among four data rows, and an intermediate viewpoint of the reference viewpoint may be formed in the remaining three data rows. Viewpoints in other consecutive data rows are formed by moving viewing zones by one sub-pixel in a direction of inclination for one period so that viewing zones can be formed in the same position according to an angle of inclination of the parallax barrier.

When, in this way, the viewpoint images are arranged in a pixel, 15 viewpoints are designed in principle based on one data row. However, 45 viewpoints are added in between, so that the same effect as that of a case where 60 viewpoints are formed, is shown. Also, an interval between viewpoints is reduced by ¼ of a reference viewpoint interval E for one data row in an OVD position, so that the number of viewpoints is increased and an interval between viewpoints is reduced and thus more natural movement parallax can be provided. For example, the order of proceeding viewpoints in one period is 1(0)->1(1)->1(2)->1(3)->2(0)->2(1)->2(2)->2(3)-> . . . (based on a distance from the center of a reference aperture of the parallax barrier). Furthermore, even in this case, the problem of color dispersion for each viewing zone does not occur. This is because color of the reference viewing zone in one period data row is the same but there is a different color from that of the reference viewing zone in adjacent viewing zones, and the parallax is sufficiently small, the effect of color dispersion is not shown.

Figure 20:
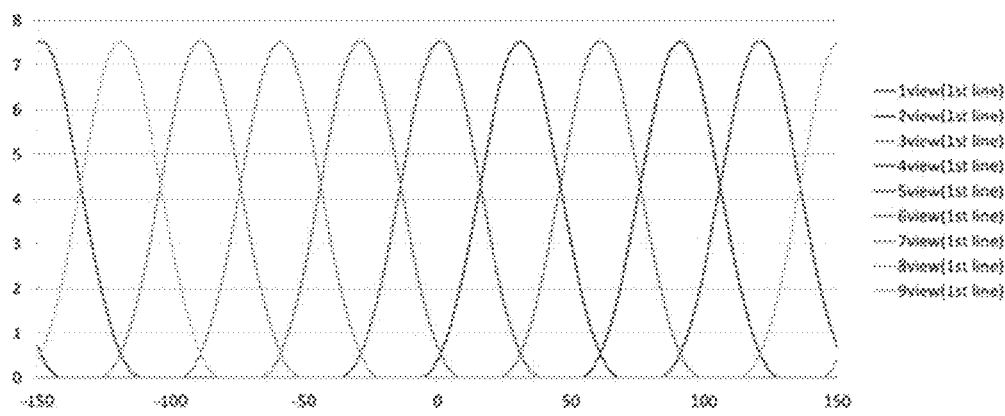
FIGS. 20 and 21 are graphs showing the intensity of light for each viewpoint when an inclined parallax separation unit or a linear light source according to the third embodiment example is applied to the pixel structure of the 3D image display apparatus according to the first embodiment of the present invention.
Figure 21:
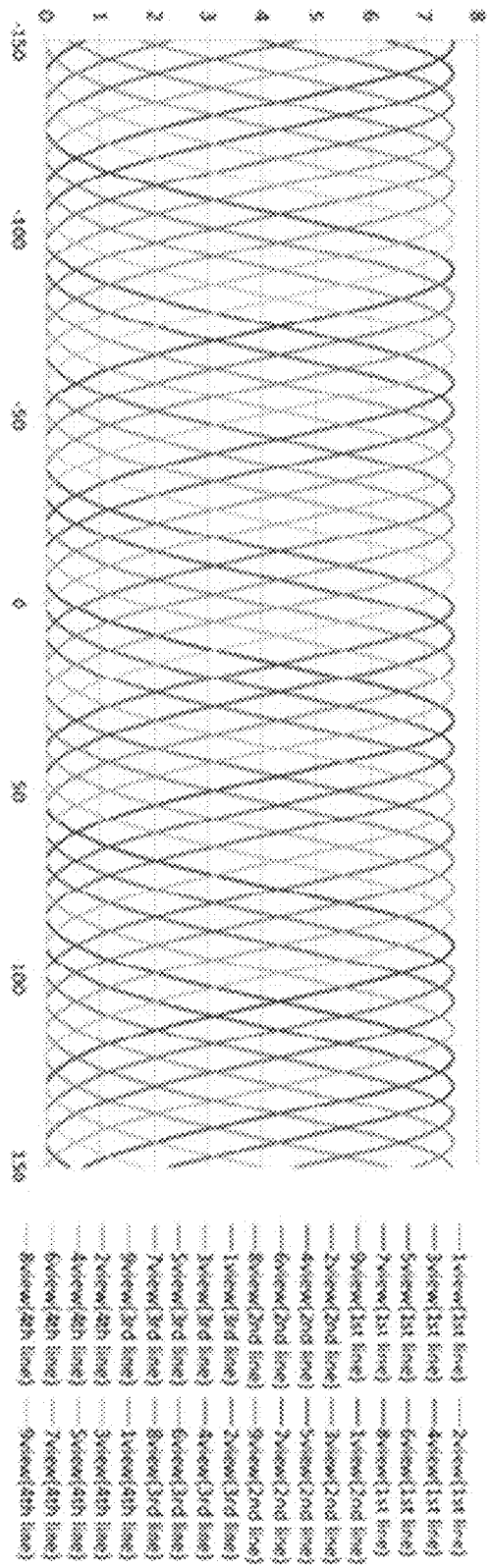

FIGS. 20 and 21 are graphs showing formation of viewing zones when a parallax separation unit or a linear light source according to the third embodiment example is applied to the pixel structure of the 3D image display apparatus according to the first embodiment of the present invention. FIG. 20 is a graph showing formation of viewing zones caused by pixels in a first row of a viewpoint data period in arrangement of viewpoint images of FIG. 19, and FIG. 21 is a graph showing formation of viewing zones caused by pixels in first to fourth rows of the viewpoint data period.

In particular, referring to FIG. 20, the size of a viewing zone in four data rows that form one period is 30 mm, and viewing zones in each data row in one period are formed by moving by E/n (=30/4=7.5 mm) in a horizontal direction (x-axis) (in this case, E is a designed viewpoint interval), and by adding viewing zones formed in four data rows, an interval between viewpoints is 7.5 mm Thus, the quantity of crosstalk calculated for each data row is reduced as an angle of inclination of the parallax barrier is smaller than a conventional angle arcTan(1/3) but, the number of representable viewpoints is increased by four times.

(Second Embodiment)

Hereinafter, a pixel structure of a 3D image display apparatus according to another embodiment of the present invention will be described with reference to FIG. 22.

Figure 22:
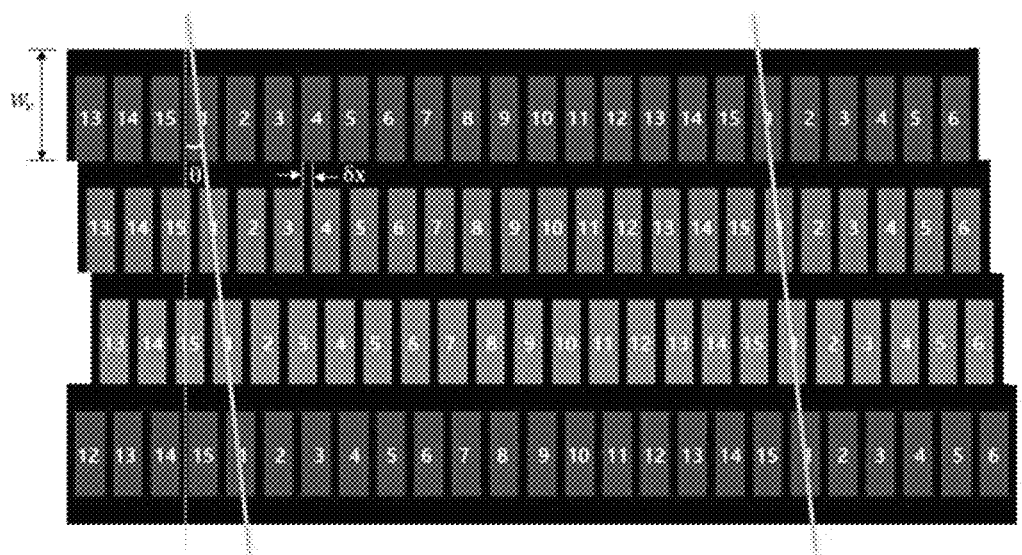
FIG. 22 is a schematic view of a pixel structure of a 3D image display apparatus according to a second embodiment of the present invention.

FIG. 22 illustrates a pixel structure of a 3D image display apparatus according to a second embodiment of the present invention. Referring to FIG. 22, RGB sub-pixels are arranged on a display panel in horizontal and vertical directions. Unlike in the pixel structure according to the first embodiment shown in FIG. 9, the pixel structure of FIG. 22 is a structure in which there is sequential center movement of sub-pixels in a reference data row. That is, sub-pixels having the same color (R, G or B) are consecutively arranged in the horizontal direction. However, sub-pixels in a particular row are arranged with a delay of a predetermined distance compared to sub-pixels in a nearby row. As illustrated in FIG. 22, in a horizontal width $W_h$ and a vertical width $W_v$ of a sub-pixel, the vertical width $W_v$ may be larger than the horizontal width $W_h$, and for example, the horizontal width $W_h$ and the vertical width $W_v$ of the sub-pixel may have the relationship of $W_v=3W_h$.

Center movement of the sub-pixels illustrated in FIG. 22 may be defined in consideration of an angle of inclination of the parallax separation unit (parallax barrier etc.). This is because, as illustrated in FIG. 22, when a designed angle of inclination of the parallax barrier and the quantity of movement of the sub-pixel of a data row are properly set, crosstalk between adjacent viewpoints is minimized In this way, an angle of inclination of the parallax barrier according to the second embodiment may be set so that the number of design viewpoints and a Moire phenomenon are minimized The relationship of the quantity of central movement of the sub-pixel for each data row may be shown as below.

$$\delta_x = W_v \tan \theta, \quad \text{[Equation 2]}$$

where $\delta_x$ is the quantity of center movement of the sub-pixel, $W_v$ is a height of the sub-pixel, and $\theta$ is an angle of inclination of the parallax barrier, the lenticular lens or the linear light source.

Figure 23:
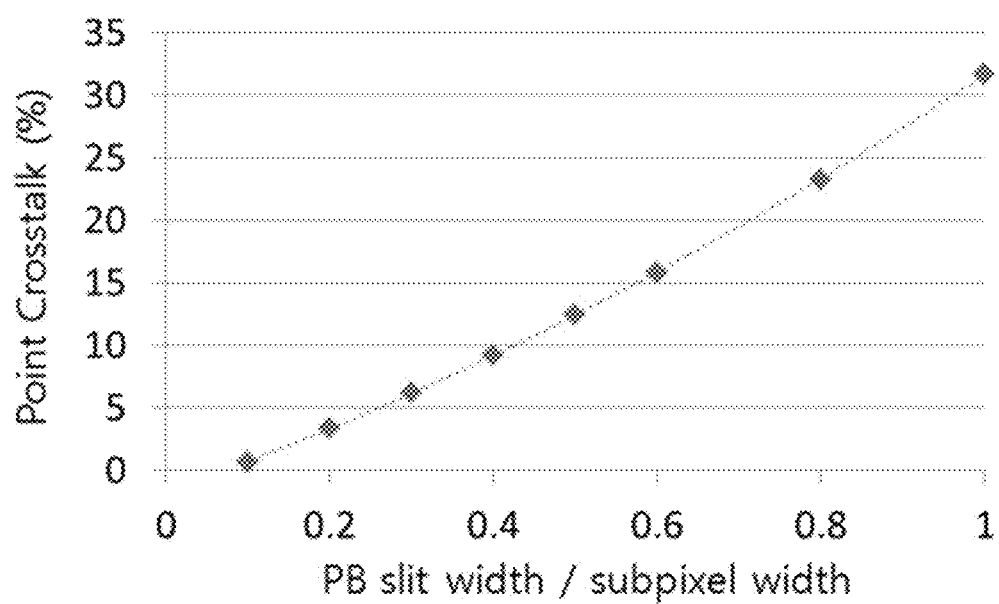
FIG. 23 is a graph for describing a crosstalk characteristic according to an aperture of a parallax barrier when an angle of inclination is arcTan(1/3) in the pixel structure according to the first embodiment of the present invention.

In the pixel structure according to the first and second embodiments, a width of an aperture of the parallax barrier or a line width of the linear light source may be equal to or less than 30% of a width of the sub-pixel. As such, crosstalk at the same angle of inclination may be minimized Table 2 and FIG. 23 show a crosstalk characteristic according to the aperture of the parallax barrier when an angle of inclination is arcTan(1/3) in the pixel structure according to the first embodiment of the present invention.

TABLE 2

| PB slit/<br>subpixel width | Point<br>Crosstalk (%) |
|---|---|
| 0.1 | 0.62 |
| 0.2 | 3.33 |
| 0.3 | 6.19 |
| 0.4 | 9.21 |
| 0.5 | 12.41 |
| 0.6 | 15.81 |
| 0.8 | 23.25 |
| 1 | 31.71 |

Referring to Table 2, even when crosstalk having an angle of inclination of the parallax barrier of arcTan(1/3) is severe, if a slit width of a conventional parallax barrier is equal to or less than 0.3 compared to a pixel width, crosstalk is equal to or less than 7% that is crosstalk of a glass type 3D image display apparatus. The above crosstalk characteristic is the result of simulation with respect to the slit width of the parallax barrier. However, of course, even when the line width of the linear light source is equal to or less than 0.3 compared to the pixel width, crosstalk is equal to or less than 7% that is crosstalk of the glass type 3D image display apparatus.

As described above, according to the present invention, a color structure of pixels of a display panel is modified so that a degree of freedom to which various angles of an optical plate can be applied, can be increased. Crosstalk can be reduced using the degree of freedom, and a color mixing phenomenon does not occur even in a state in which an angle of inclination of the optical plate is free. Furthermore, since a method of aligning the optical plate can be freely used, horizontal and vertical resolution ratios can be adjusted. Even in this case, the color mixing phenomenon does not occur. Furthermore, due to the degree of freedom of an angle for aligning the optical plate, a Moire phenomenon can be fundamentally removed.

While exemplary embodiments with respect to a autostereoscopic 3D image display apparatus having a modified sub-pixel structure according to the present invention have been described, the invention is not limited thereto and may be embodied with various modifications within the scope of the appended claims, detailed description and the accompanying drawings, and such embodiments are also within the scope of the invention. For example, the autostereoscopic 3D image display apparatus according to the present invention includes a parallax barrier, a lenticular lens or a linear light source disposed to be spaced apart from a display panel on which pixels are arranged, and although not shown, a controller can dispose viewpoint images on the display panel, thereby generating 3D images. Furthermore, the autostereoscopic 3D image display apparatus according to the present invention can further include an observer position tracking system that determines an observer's pupil position to transmit position information to the controller.

What is claimed is:

1. Autostereoscopic three-dimensional (3D) image display apparatus having a modified sub-pixel structure, the autostereoscopic 3D image display apparatus comprising:
   a display panel on which pixels are arranged;
   a parallax barrier, a lenticular lens or a linear light source disposed to be spaced apart from the display panel; and
   a controller generating a 3D image by arranging viewpoint images on the display panel,
   wherein sub-pixels having the same color are consecutively arranged on the display panel in a horizontal direction, and sub-pixels having red, green, and blue (RGB) colors form one unit pixel in a vertical direction,
   wherein the parallax barrier, the lenticular lens or the linear light source has an angle of inclination inclined from the vertical direction of the display panel,
   wherein the angle of inclination is arcTan(1/n), and n is a multiple of 3(n=3m),
   wherein, when m is 2, the controller distributes viewpoint data on a cycle of two data rows, forms a reference viewpoint based on a data row close to the aperture of the parallax barrier among two data rows, forms an intermediate viewpoint of the reference viewpoint in the remaining, one data row, and forms viewpoints in data rows by moving viewpoints by one sub-pixel in a direction of inclination for one period, and
   wherein, when m is 3, the controller distributes viewpoint data on a cycle of three data rows, forms a reference viewpoint based on a data row close to the aperture of the parallax barrier among three data rows, forms an intermediate viewpoint of the reference viewpoint in the remaining, two data rows, and forms viewpoints in data rows by moving viewpoints by one sub-pixel in a direction of inclination for one period.

2. The autostereoscopic 3D image display apparatus of claim 1, wherein a vertical width $W_v$ of the sub-pixel is larger than a horizontal width $W_h$ of the sub-pixel.

3. The autostereoscopic 3D image display apparatus of claim 2, wherein the horizontal width $W_h$ and the vertical width $W_v$ of the sub-pixel satisfy the relationship of $W_v=3W_h$.

4. The autostereoscopic 3D image display apparatus of claim 1, wherein, when sub-pixels having the RGB colors form one unit pixel in the vertical direction, the sub-pixels having the RGB colors are arranged in a line perpendicular to the horizontal direction.

5. The autostereoscopic 3D image display apparatus of claim 1, wherein, when sub-pixels having the RGB colors form one unit pixel in the vertical direction, the sub-pixels that form the one unit pixel are arranged when a center of the sub-pixel is sequentially moved from a reference sub-pixel row to an adjacent sub-pixel row.

6. The autostereoscopic 3D image display apparatus of claim 5, wherein center movement of the sub-pixel satisfies the following equation according to an angle of inclination of the parallax barrier, the lenticular lens or the linear light source, $$\delta_x = W_v \tan \theta \quad \text{[Equation]}$$

where $\delta_x$ is the quantity of center movement of the sub-pixel, $W_v$ is a height of the sub-pixel, and $\theta$ is an angle of inclination of the parallax barrier, the lenticular lens or the linear light source.

7. The autostereoscopic 3D image display apparatus of claim 1, wherein a width of an aperture of the parallax barrier or a line width of the linear light source is equal to or less than 30% of a width of the sub-pixel.

8. The autostereoscopic 3D image display apparatus of claim 1, wherein the parallax barrier, the lenticular lens or the linear light source is perpendicular to the horizontal direction of the display panel.

9. The autostereoscopic 3D image display apparatus of claim 1, further comprising an observer position tracking system that determines an observer's pupil position to transmit position information to the controller.

10. Autostereoscopic three-dimensional (3D) image display apparatus having a modified sub-pixel structure, the autostereoscopic 3D image display apparatus comprising:
    a display panel on which pixels are arranged;
    a parallax barrier, a lenticular lens or a linear light source disposed to be spaced apart from the display panel; and
    a controller generating a 3D image by arranging viewpoint images on the display panel,
    wherein sub-pixels having the same color are consecutively arranged on the display panel in a horizontal direction, and sub-pixels having red, green, and blue (RGB) colors form one unit pixel in a vertical direction,
    wherein the parallax barrier, the lenticular lens or the linear light source has an angle of inclination inclined from the vertical direction of the display panel,
    wherein the angle of inclination is arcTan(1/n), and n is not a multiple of 3(n≠3m),
    wherein, when n is 4, the controller distributes viewpoint data on a cycle of four data rows, forms a reference viewpoint based on a data row close to the aperture of the parallax barrier among four data rows, forms an intermediate viewpoint of the reference viewpoint in the remaining, three data rows, and forms viewpoints in data rows by moving viewpoints by one sub-pixel in a direction of inclination for one period.

11. Autostereoscopic three-dimensional (3D) image display apparatus having a modified sub-pixel structure, the autostereoscopic 3D image display apparatus comprising:
   a display panel on which pixels are arranged;
   a parallax barrier, a lenticular lens or a linear light source disposed to be spaced apart from the display panel; and
   a controller generating a 3D image by arranging viewpoint images on the display panel,
   wherein sub-pixels having the same color are consecutively arranged on the display panel in a horizontal direction, and sub-pixels having red, green, and blue (RGB) colors form one unit pixel in a vertical direction, and
   wherein a movement of a center of each of the sub-pixels that form the one unit pixel satisfies the following equation according to an angle of inclination of the parallax barrier, the lenticular lens or the linear light source, $$\delta_x = W_y \tan \theta \quad \text{[Equation]}$$

where $\delta_x$ is the quantity of center movement of the sub-pixel, $W_y$ is a height of the sub-pixel, and $\theta$ is an angle of inclination of the parallax barrier, the lenticular lens or the linear light source.

* * * * *